US007633592B2

(12) United States Patent
Kobashi et al.

(10) Patent No.: US 7,633,592 B2
(45) Date of Patent: Dec. 15, 2009

(54) LIQUID CRYSTAL DISPLAY DEVICE AND ELECTRONIC DEVICE

(75) Inventors: Yutaka Kobashi, Mizuho (JP); Takashi Toya, Gifu (JP)

(73) Assignee: Epson Imaging Devices Corporation, Nagano (JP)

( * ) Notice: Subject to any disclaimer, the term of this patent is extended or adjusted under 35 U.S.C. 154(b) by 735 days.

(21) Appl. No.: 11/482,839

(22) Filed: Jul. 10, 2006

(65) Prior Publication Data

US 2007/0008266 A1 Jan. 11, 2007

(30) Foreign Application Priority Data

Jul. 11, 2005 (JP) ............................. 2005-201182

(51) Int. Cl.
*G02F 1/1345* (2006.01)
*G02F 1/1343* (2006.01)
*G09G 3/36* (2006.01)

(52) U.S. Cl. ......................... 349/152; 349/139; 345/90; 345/94

(58) Field of Classification Search ....................... None
See application file for complete search history.

(56) References Cited

U.S. PATENT DOCUMENTS 4,795,239 A 1/1989 Yamashita et al.
7,312,638 B2 * 12/2007 Kobashi ...................... 326/83
7,414,602 B2 * 8/2008 Kobashi ...................... 345/87

FOREIGN PATENT DOCUMENTS

JP 62-49399 3/1987

* cited by examiner

*Primary Examiner*—Omar Rojas
(74) *Attorney, Agent, or Firm*—Morrison & Foerster LLP

(57) ABSTRACT

A relaxation time in a common inversion drive of a liquid crystal display device is minimized. The liquid crystal display device includes a plurality of scan lines, a plurality of data lines that intersects the plurality of scan lines, a plurality of pixel switching devices dispose corresponding to intersections of the data lines and the scan lines, a plurality pixel electrodes connected with the plurality of pixel switching devices, a common electrode facing the pixel electrodes to form capacitors, a common power supply circuit connected with the common electrode and outputting a square wave alternating between a higher electric potential and a lower electric potential at a regular intervals and a first reference electric potential power supply circuit outputting a first reference electric potential to the scan lines through a low impedance at a common electric potential inversion timing that is a timing of alternation of the square wave, wherein an impedance from the common power supply circuit to the common electrode is approximately equal to an impedance from the first reference electric potential power supply circuit to the scan lines.

13 Claims, 15 Drawing Sheets

LIQUID CRYSTAL DISPLAY DEVICE AND ELECTRONIC DEVICE

CROSS-REFERENCE OF THE INVENTION

This application is based on Japanese Patent Application No. 2005-201182, the content of which is incorporated herein by reference in its entirety.

BACKGROUND OF THE INVENTION

1. Field of the Invention

This invention relates to a liquid crystal display device and an electronic device including the display device, specifically to a liquid crystal display device using an active matrix substrate.

2. Description of the Related Art

A liquid crystal display device with an active matrix circuit using active devices such as TFTs (Thin Film Transistors) has come into widespread use including a laptop PC and a monitor in recent years.

In a liquid crystal display device using a conventional nematic liquid crystal material, a display status of each pixel is controlled by an electric potential difference between a pixel electrode switched by the active device and a common electrode. When a large electric potential difference is applied between the pixel electrode and the common electrode, that is, when black is displayed in a normally white mode or when white is displayed in a normally black mode, a maximum electric potential difference between the common electrode and the pixel electrode is usually three to five volts, although it varies depending on the liquid crystal material used, a mode of the liquid crystal and a gap of the liquid crystal. In order to secure reliability of the liquid crystal device, the liquid crystal display device requires inverting a polarity of voltage applied to the liquid crystal at a certain interval, or an alternating current drive. Assuming that the electric potential of the common electrode is fixed, the electric potential amplitude of a signal written into the pixel electrode, that is, a video signal inputted to a data line of the active matrix circuit, is six to ten volts.

When the video signal inputted to the data line is written-in by an external data driver IC, however, an expensive IC manufactured, not only by a conventional CMOS process but by a high withstand voltage process, is required in order to output the electric potential amplitude higher that five volts, leading to an increased cost and increase power consumption. To solve the problem described above, a drive method to reduce by half the amplitude of the input signal to the data line by using a common inversion drive in which the polarity of the common electrode is alternated is proposed in Japanese Patent Application Publication No. S62-49399, for example.

When the common inversion drive proposed above is applied to a large and high resolution display panel, however, capacitance of the common electrode is increased to increase a relaxation time and the maximum instantaneous current at a common electric potential inversion timing.

This invention is directed to solving the problems addressed above, and offers a liquid crystal display device and an electronic having the display device, which are small in dimensions of periphery of the panel and low in power consumption.

SUMMARY OF THE INVENTION

This invention provides a liquid crystal display device having a plurality of scan lines, a plurality of data lines disposed to intersect the scan lines, a plurality of pixel switching devices disposed corresponding to intersections of the data lines and the scan lines, a plurality of pixel electrodes disposed corresponding to the pixel switching devices, a common electrode facing to the pixel electrodes to form capacitors, a common power supply circuit connected with the common electrode and outputting a square wave signal alternating between a higher electric potential and a lower electric potential at regular intervals and a first reference electric potential power supply circuit that outputs a first reference electric potential of a constant electric potential to the scan lines at a common electric potential inversion timing that is a timing of alternation of the square wave signal, wherein the first reference electric potential power supply circuit is connected to the common power supply circuit through a low impedance and an impedance RA between the common power supply circuit and the common electrode is approximately the same as an impedance RB between the first reference electric potential power supply circuit and the scan lines.

With a structure described above, a relaxation time at the common electric potential inversion timing can be suppressed and a period from the common electric potential inversion timing to a timing to write a selection electric potential into the scan line and a period to select the scan line can be secured. As a result, it is made possible to apply the common inversion drive to a panel that has been difficult to apply the common inversion drive and to manufacture the panel with a high yield. It is also made possible to realize a low cost, low power consumption liquid crystal display device, using a less expensive low withstand voltage IC as an external driver IC without reducing yields.

This invention also provides the liquid crystal display device further including a first wiring that electrically connects the first reference electric potential power supply circuit with the scan lines and a second wiring that electrically connects the common power supply circuit with the common electrode, wherein a width of the first wiring is approximately equal to a width of the second wiring.

With a structure described above, the relaxation time at the common electric potential inversion timing can be optimized by specifying the widths of the first and second wirings.

And in the liquid crystal display device of this invention, among widths of the wirings connecting signal sources and the power supplies to the drive circuits, the width of the first wiring and the width of the second wiring are greater than widths of the other wirings.

With a structure described above, the relaxation time at the common electric potential inversion timing can be optimized making resistances of the first and second wirings smaller than resistances of the other wirings.

This invention also provides the liquid crystal display device further including a plurality of mounting terminals formed on a single substrate together with the plurality of scan lines, the plurality of data lines and the plurality of pixel switching devices, the plurality of mounting terminals including a first mounting terminal connected with the first reference electric potential power supply circuit and a second mounting terminal connected with the common power supply circuit, wherein the first mounting terminal is approximately equal to the second mounting terminal in the number of constituting unit mounting terminals or in an area of the terminal.

With a structure described above, a liquid crystal display device with a large display area, a small panel periphery dimensions and small current consumption can be manufactured, since the relaxation time at the common electric potential inversion timing can be optimized by specifying the areas of the first and second mounting terminals while optimizing outer dimensions of the panel. And the cost can be reduced by using the low withstand voltage IC.

And in the liquid crystal display device of this invention, the first and second mounting terminals are larger in the number of unit mounting terminals or larger in the area of the terminal compared with the other mounting terminals for other signals and a power supply.

With a structure described above, the relaxation time at the common electric potential inversion timing can be optimized by making resistances of the first and second mounting terminals smaller than resistances of the other mounting terminals.

This invention also provides the liquid crystal display device further including a second reference electric potential power supply circuit that is connected with the data lines through a low impedance and outputs a second reference electric potential of a constant electric potential at the common electric potential inversion timing, that is the timing of inversion of the output of the common power supply circuit.

With a structure described above, a write-in time can be reduced by performing a precharge operation for a period encompassing the common electric potential inversion timing, to realize a larger display area and lower power consumption.

This invention also provides the liquid crystal display device further including a third wiring that electrically connects the second reference electric potential power supply circuit with the plurality of data lines, wherein a sum of the width of the first wiring and a width of the third wiring is approximately equal to the width of the second wiring.

With a structure described above, the relaxation time at the common electric potential inversion timing can be optimized in the liquid crystal display device having a precharge function by considering the width of the third wiring that electrically connects the data lines.

In the liquid crystal display device of this invention, among the widths of wirings connecting the signal sources and the power supplies to the drive circuits, the widths of the first, second and third wirings are greater than widths of the other wirings.

With a structure described above, the relaxation time at the common electric potential inversion timing can be optimized by making the resistances of the first, second and third wirings smaller than the resistances of the other wirings.

This invention also provides the liquid crystal display device further including a third mounting terminal that is a part of the plurality of mounting terminals and connected with the second reference electric potential power supply circuit, wherein a sum of the number of unit mounting terminals of the first mounting terminal and the number of unit mounting terminals of the third mounting terminal is approximately equal to the number of unit mounting terminals of the second mounting terminal or a sum of the area of the first mounting terminal and an area of the third mounting terminal is approximately equal to the area of the second mounting terminal.

With a structure described above, the relaxation time at the common electric potential inversion timing can be optimized in the liquid crystal display device having the precharge function by considering the area of the third mounting terminal that electrically connects the data lines.

And in the liquid crystal display device of this invention, the first, second and third mounting terminals are larger in the number of unit mounting terminals or larger in the area compared with the other mounting terminals for other signals and the power supply.

With a structure described above, a liquid crystal display device with a large display area, a small panel periphery dimensions and small current consumption can be manufactured, since the relaxation time at the common electric potential inversion timing can be optimized by reducing the resistance of the other mounting terminals while optimizing the outer dimensions of the panel, even when the precharge operation is performed for the period encompassing the common electric potential inversion timing.

This invention also provides a liquid crystal display device including a plurality of scan lines, a plurality of data lines disposed to intersect the scan lines, a plurality of pixel switching devices disposed corresponding to intersections of the data lines and the scan lines, a plurality of pixel electrodes disposed corresponding to the pixel switching devices, a common electrode facing to the pixel electrodes to form capacitors, a common power supply circuit connected with the common electrode and outputting a square wave signal alternating between a higher electric potential and a lower electric potential at regular intervals, a first reference electric potential power supply circuit that provides the scan lines with a non-select electric potential, a common electric potential wiring that electrically connects a common electric potential terminal receiving the square wave signal from the common power supply circuit with the common electrode, and a power supply wiring that connects a power supply terminal receiving the non-select electric potential from the first reference electric potential power supply circuit with a scan line drive circuit that drives the scan lines, wherein impedance of the common electric potential wiring is approximately equal to an impedance of the power supply wiring.

With a structure described above, the relaxation time at the common electric potential inversion timing can be suppressed and the period from the common electric potential inversion timing to the timing to write the selection electric potential into the scan line and the period to select the scan line can be secured. As a result, it is made possible to apply the common inversion drive to a panel that has been difficult to apply the common inversion drive and to manufacture the panel with a high yield. It is also made possible to realize a low cost, low power consumption liquid crystal display device, using a less expensive low withstand voltage IC as an external driver IC.

This invention offers an electronic device provided with the liquid crystal display device described above.

With a structure described above, a low cost electronic device with high picture quality display which operates for many hours with a battery is made available, since the less expensive low withstand voltage IC can be used as the external driver IC and the low power consumption liquid crystal display device with less visible flicker can be used as a display. To be more specific, the electronic device means a monitor, a TV, a note PC, a PDA (Personal Digital Assistant), a digital still camera, a camcorder, a mobile telephone, a mobile photo viewer, a mobile video player, a mobile DVD player, a mobile audio player and the like.

DETAILED DESCRIPTION OF THE INVENTION

Figure 1:
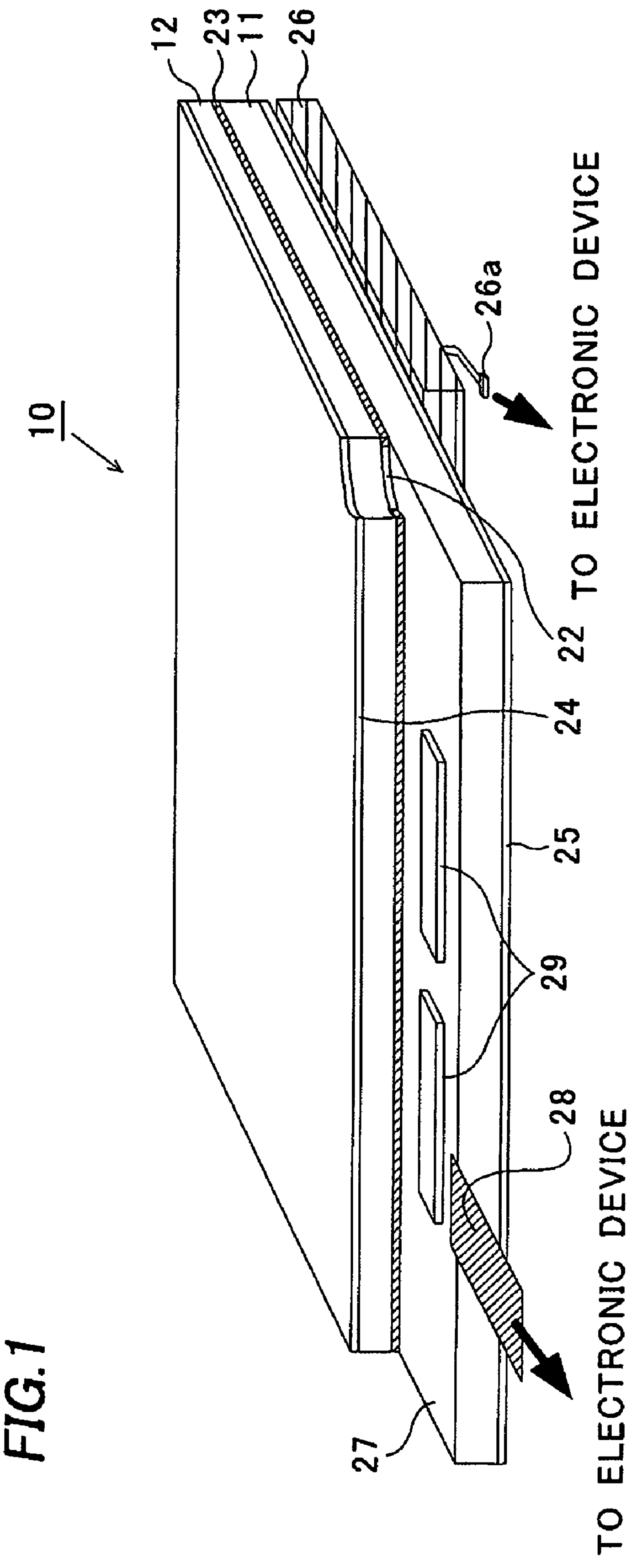
FIG. 1 is an oblique perspective (partially cross-sectional) view of a liquid crystal display device according to embodiments of this invention.

A liquid crystal display device according to embodiments of this invention will be explained hereafter referring to the drawings.

FIG. 1 shows a structure of a liquid crystal display device 10 according to a first embodiment of this invention. FIG. 1 is an oblique perspective (partially cross-sectional) view of the four inch diagonal transmissive liquid crystal display device 10 with VGA resolution. The liquid crystal display device 10 has an active matrix substrate 11, a counter substrate 12 and a nematic phase liquid crystal material 22 interposed between them. A sealing material 23 bonds the both substrates 11 and 12 together to seal the liquid crystal material 22. An alignment material made of polyimide or the like is coated and rubbing-processed to form an alignment film on pixel electrodes on the active matrix substrate 11, although it is not shown in the figure. And color filters corresponding to pixels and a counter electrode 30 made of an ITO (Indium-Tin Oxide) film, to which a common electric potential is provided, are formed on the counter substrate 12, although not shown in the figure. An alignment material made of polyimide or the like is coated on a surface contacting the liquid crystal material 22 and rubbing-processed in a direction orthogonal to a direction of rubbing-processing applied to the alignment film on the active matrix substrate 11. And the counter electrode 30 is electrically connected with a vertical conduction portion 56 on the active matrix substrate 11 through a conductive material, although it is not shown in the figure.

An upper polarizing plate 24 is disposed on a outer surface of the counter substrate 12 and a lower polarizing plate 25 is disposed on a outer surface of the active matrix substrate 11 so that directions of polarization of the two polarizing plates are orthogonal to each other (cross-Nicol arrangement). A back light unit 26 that makes a surface light source is disposed under the lower polarizing plate 25. The back light unit 26 may be a cold cathode tube or an LED (Light-Emitting Diode) attached to an optical waveguide plate or a scattering plate, or a unit that is made of electroluminescent device and emits light from its whole surface. The back light unit 26 is connected to a body of an electronic device through a connector 26*a* and is provided with a power supply and a control signal. Although not shown in the figure, a hull may be attached to cover the liquid crystal display device 10, a protection glass or acryl plate may be attached over the upper polarizing plate 24, or an optical compensation film may be stuck to it in order to improve a viewing angle, if necessary.

The active matrix substrate 11 has an extended portion 27 that sticks out of the counter substrate 12. The extended portion 27 is provided with a plurality of signal input terminals 53 (not shown). An FPC (Flexible Printed Circuit Board) 28 and an external driver IC 29 are mounted on the extended portion 27 and are electrically connected with the signal input terminals 53. Although the external driver IC 29 is formed of two ICs in FIG. 1, it may be formed of one or more than two ICs. The FPC 28 is connected to the electronic device and provides a reference electric potential, a control signal and video data.

Figure 2:
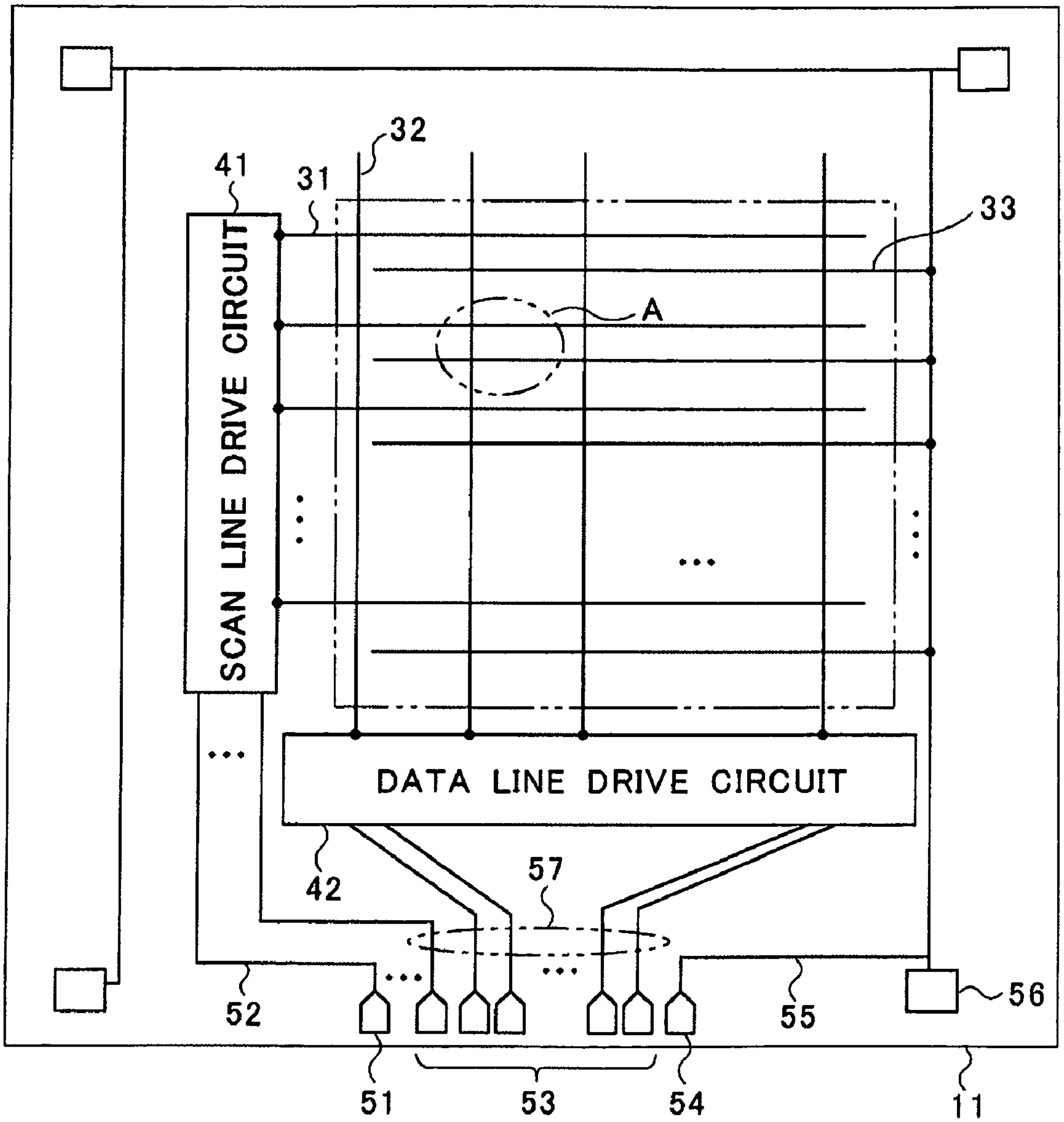
FIG. 2 shows a structure of an active matrix substrate according to a first embodiment of this invention.

Next, a structure of the active matrix substrate 11 is described referring to FIG. 2. FIG. 2 shows the active matrix substrate 11. On the active matrix substrate 11, m (a natural number, 480 in this embodiment) scan lines 31 and n (a natural number, 1920 in this embodiment) data lines 32 are formed to intersect with each other, and m capacitor lines 33 are disposed parallel to the scan lines 31 so that each of the capacitor lines 33 is paired with each of the scan lines 31.

The scan lines 31 are connected to a scan line drive circuit 41. The scan line drive circuit 41 is connected with a power supply terminal 51 through a power supply wiring 52, and is also connected with the signal input terminals 53 through a plurality of signal wirings 57. The scan line drive circuit 41 is provided from the power supply terminal 51 with a DC power supply electric potential VBB (−4V) that renders the scan lines 31 in holding state (non-selected state) and from the signal input terminals 53 with various necessary signals and a signal to give the power supply electric potential. A data line drive circuit 42 is connected to the data lines 32. The data line drive circuit 42 is connected to the signal input terminals 53 through the signal wirings 57 and is provided with various necessary signals and the signal to give the power supply electric potential.

The capacitor lines 33 are connected with each other and connected to a common electric potential input terminal 54 through a common electric potential wiring 55, and are provided with a common electric potential signal VCOM (an inverting signal alternating between −4.5V and −0.5V). The counter electrode 30 on the counter substrate 12 is connected with the vertical conduction portion 56 that is disposed at each of four corners of the active matrix substrate 11 and is similarly connected to the common electric potential input terminal 54 through the common electric potential wiring 55.

Figure 3:
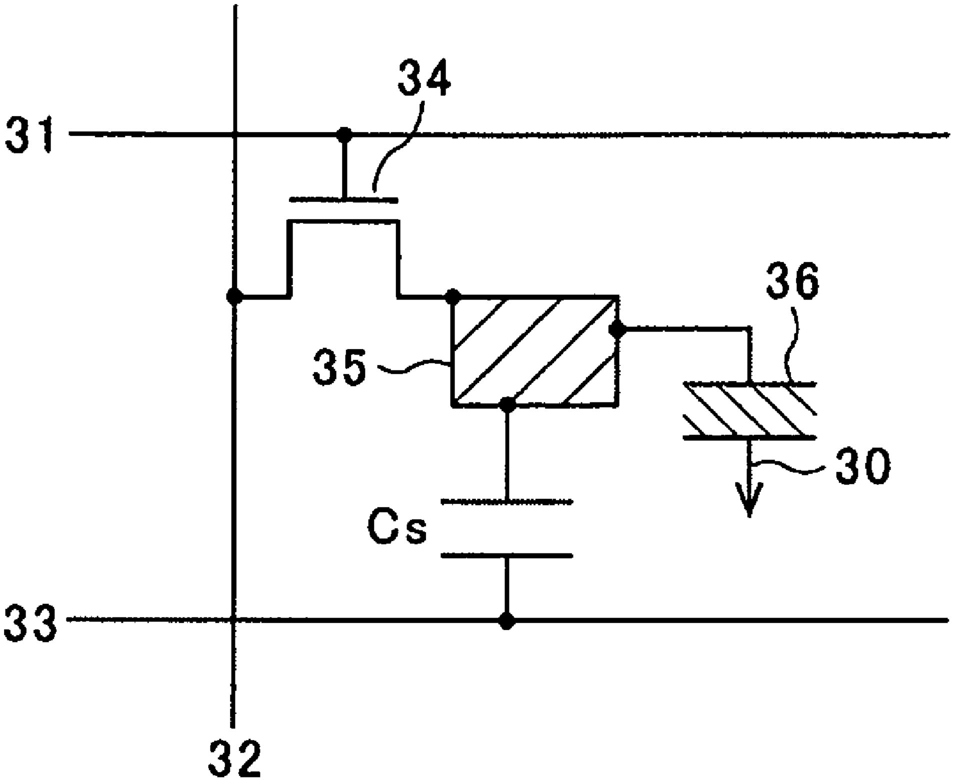
FIG. 3 shows a structure of a pixel on the active matrix substrate according to the embodiments of this invention.

Next, a structure of a pixel circuit is described referring to FIG. 3. FIG. 3 shows a magnified view of a portion around an intersection of the scan line 31 and the data line 32 indicated with a chain line circle A in FIG. 2. A pixel switching device 34 made of an N-channel type polysilicon thin film field effect transistor is formed at a location corresponding to each of intersections of the scan lines 31 and the data lines 32. Its gate electrode is connected to a respective scan line 31, its source electrode is connected to a respective data line 32, and its drain electrode is connected to a respective pixel electrode 35. The liquid crystal material 22 is interposed between the pixel electrode 35 and the counter electrode (common electrode)

30 on the counter substrate 12 to form a liquid crystal capacitor 36, while an auxiliary capacitor Cs is formed in parallel to the liquid crystal capacitor 36 with a pixel electric potential side of the pixel electrode 35 and the capacitor line 33.

Figure 4:
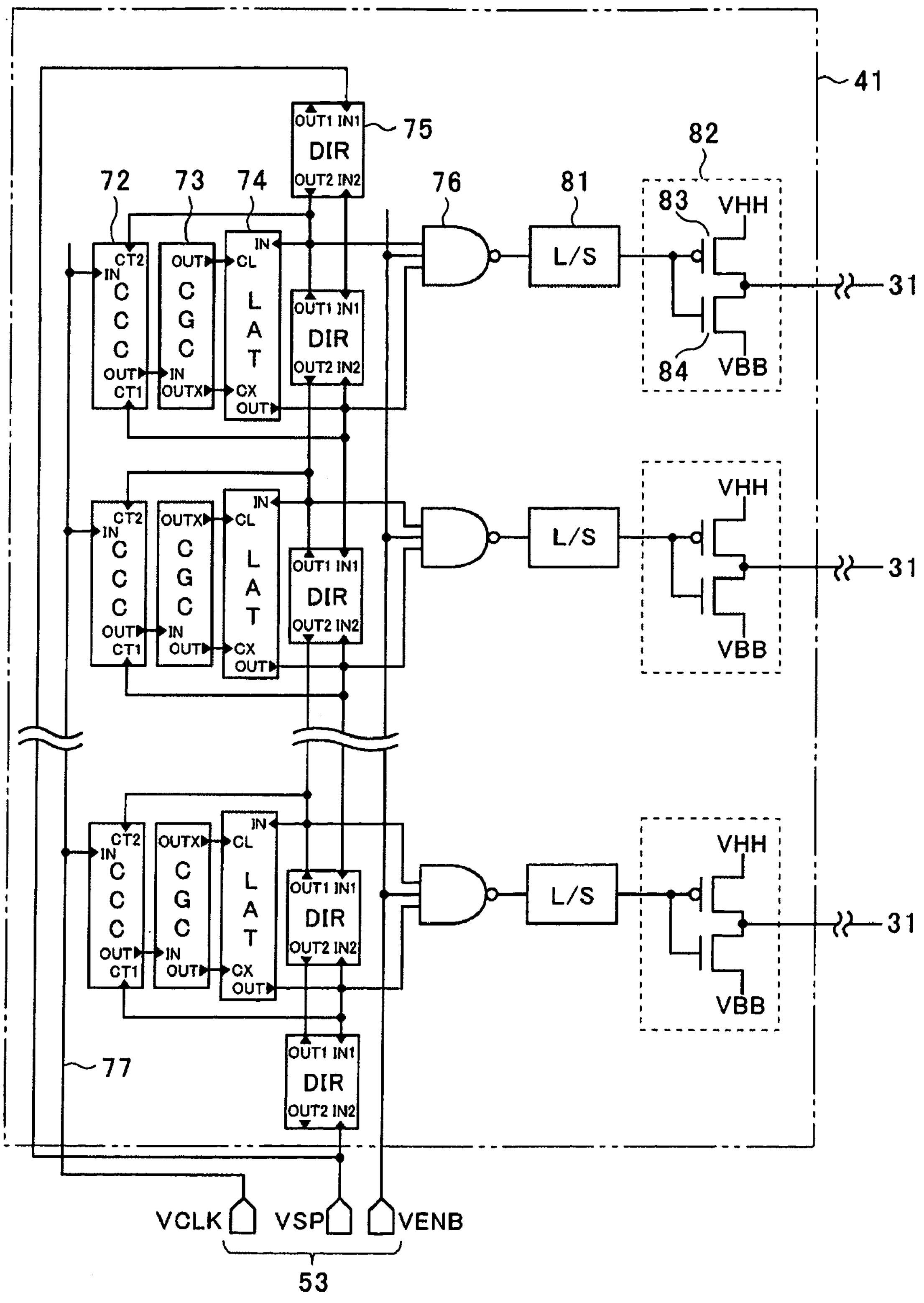
FIG. 4 shows a structure of a scan line drive circuit according to the embodiments of this invention.

Next, a structure of the scan line drive circuit 41 is described referring to FIGS. 4, 5A, 5B, 5C, 5D and 5E. FIG. 4 is a block diagram of the scan line drive circuit 41. FIGS. 5A, 5B, 5C, 5D and 5E show detailed structure of circuits constituting the scan line drive circuit 41.

The scan line drive circuit 41 is composed of clock control circuits (CCC) 72, clock generation circuits (CGC) 73, latch circuits (LAT) 74, bidirectional transfer circuits (DIR) 75, NAND circuits 76, level shift circuits (L/S) 81 and output circuits 82. The clock control circuits 72, the clock generation circuits 73, the latch circuit 74, the bidirectional transfer circuits 75 and the NAND circuits 76 are provided with a power supply electric potential VD (5V) and a power supply electric potential VS (0V) from the external driver IC 29 through the signal input terminals 53 and the signal wirings 57, although not shown in the figure. Similarly, the level shift circuits 81 are provided with the power supply electric potential VS (0V), a power supply electric potential VHH (9V) and a power supply electric potential VBB (−4V), while the output circuits 82 are provided with the power supply electric potential VHH (9V) and the power supply electric potential VBB (−4V).

Figure 5A:
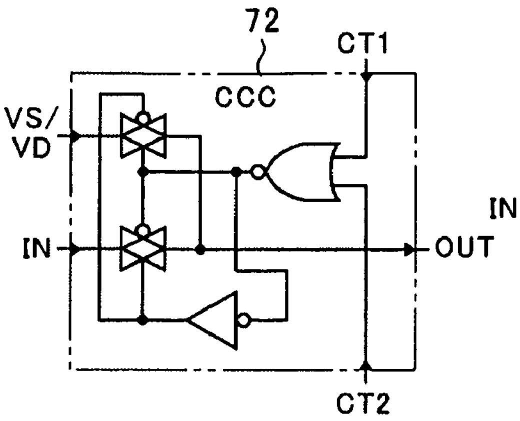
FIGS. 5A, 5B, 5C, 5D and 5E are circuit diagrams of circuits constituting the scan line drive circuit according to the embodiments of this invention.

In the clock control circuit 72, as shown in FIGS. 4 and 5A, a clock signal VCLK is inputted from the signal input terminal 53 to a terminal IN through the clock signal line 77, a signal OUT1 from the bidirectional transfer circuit 75 is inputted to a terminal CT2 and a signal OUT from the latch circuit 74 is inputted to a terminal CT1. The clock control circuit 72 outputs a signal OUT that provides or cuts off the clock signal VCLK to the clock generation circuit 73 based on signals CT1 and CT2. That is, the clock control circuit 72 passes the clock signal VCLK when either of the signals CT1 or CT2 is at a high level, while it cuts off the clock signal VCLK and outputs a fixed electric potential at a level of VS or VD when both of the signals CT1 and CT2 are at a low level. As a result, a capacitive load on the clock signal VCLK can be reduced by supplying the clock signal VCLK only to a required stage and not supplying the clock signal VCLK to the other stages. In the first embodiment, VS is applied to odd-numbered stages while VD is applied to even-numbered stages. With this structure, current consumption can be reduced while malfunctioning is prevented, since the capacitive load of the clock signal line 77 is reduced by supplying the clock signal VCLK only to the stage in which signal transfer is taking place. The clock control circuit 72 can be omitted in the case where the load of the clock signal line 77 does not matter.

Figure 5B:
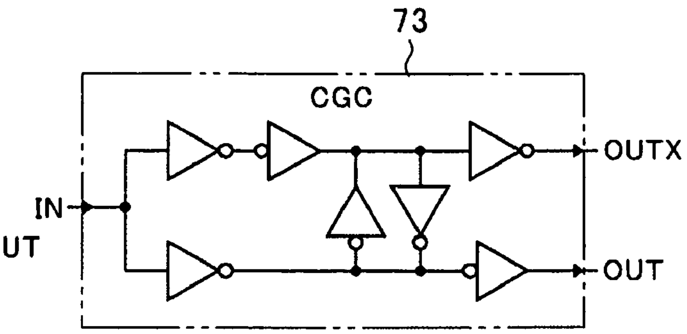
Figure 5C:
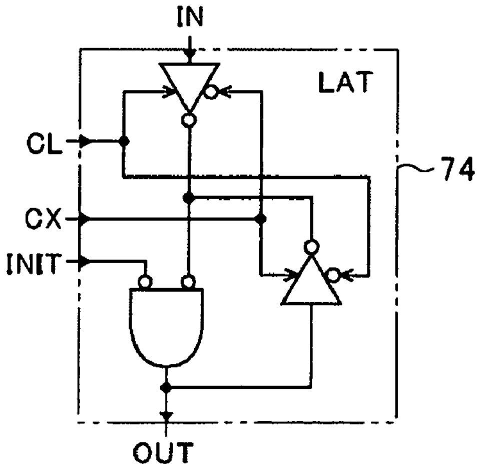

Next, in the clock generation circuit 73, the clock signal VCLK, that is a unipolar clock signal outputted from the terminal OUT of the clock control circuit 72, is inputted to a terminal IN, as shown in FIGS. 4 and 5B. The clock generation circuit 73 generates bipolar clock signals with no phase deviation from each other and outputs them from terminals OUT and OUTX to the latch circuit 74. With this structure, malfunctioning of the latch circuit 74 due to the phase deviation between the outputted bipolar clock signals can be prevented. The clock generation circuit 73 can be omitted by simply inverting the clock signal VCLK in the case where the phase deviation between the clock signals does not matter.

The latch circuit 74 latches or sequentially transfers a start pulse signal VSP inputted to a terminal IN from the signal input terminal 53 through the bidirectional transfer circuit 75 with the clock signals CL and CX generated from the clock signal VCLK in the clock generation circuit 73. That is, the latch circuit 74 transfers the start pulse signal VSP when the clock signal CL is high and the reverse clock signal CX is low, and latches it when the clock signal CL is low and the reverse clock signal CX is high. And the latch circuit 74 is reset and forced to output a low level when an initialization signal INIT is high.

Figure 5D:
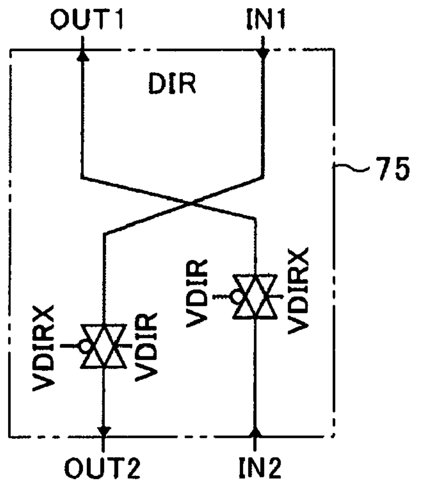

The bidirectional transfer circuits 75 perform a forward transfer that data is transferred from the first scan line 31 toward the m-th scan line 31 when a transfer direction control signal VDIR is high and a reverse transfer direction control signal VDIRX is low, and perform a reverse transfer that the data is transferred from the m-th scan line toward the first scan line when the transfer direction control signal VDIR is low and the reverse transfer direction control signal VDIRX is high, as shown in FIGS. 4 and 5D. The bidirectional transfer circuits 75 can be omitted when the bidirectional transfer is not required.

An output signal OUT of the latch circuit 74, another output signal OUT of a preceding or following stage of the latch circuit and an enable signal VEMB inputted from the signal input terminal 53 are inputted to the NAND circuit 76. The NAND circuit 76 outputs a result of NAND of the inputted signals. To be more specific, only a selected stage of NAND circuit 76 outputs a low (VS) level at timing when the output signal OUT from the latch circuit 74 is inputted to the NAND circuit 76 and the enable signal VEMB is at a high (VD) level, while the other stages of NAND circuits 76 output the high (VD) level. The signal ranging between VD and VS is converted to a signal ranging between VHH and VBB by the level shift circuit 81 and inputted to gate electrodes of a P-channel type transistor 83 and an N-channel type transistor 84 in the output circuit 82.

Figure 5E:
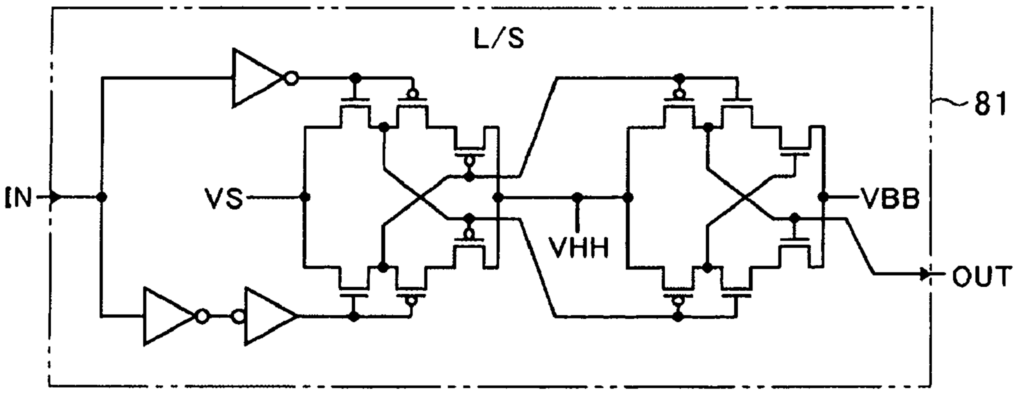

FIG. 5E shows a structure of the level shift circuit 81 which is composed of two so-called flip-flop type level shifters arrayed in series, and converts the signal ranging between VD and VS to the signal ranging between VHH and VBB. When the output from the NAND circuit 76 is low (VS), that is, in a selected state, the electric potential VHH is written into the scan line 31 by the P-channel type transistor 83. As a result, the electric potential VHH is supplied as a selection electric potential to the gate electrode of a transistor, which makes the pixel switching device 34, to render the pixel switching device 34 of low impedance. And when the output signal from the NAND circuit 76 is high (VHH), the power supply electric potential VBB is written into the scan line 31 by the N-channel type transistor 84. As a result, the electric potential VBB (−4V) is supplied as a non-selection electric potential to the gate electrode of the transistor, which makes the pixel switching device 34, to render the pixel switching device 34 of high impedance.

Figure 6:
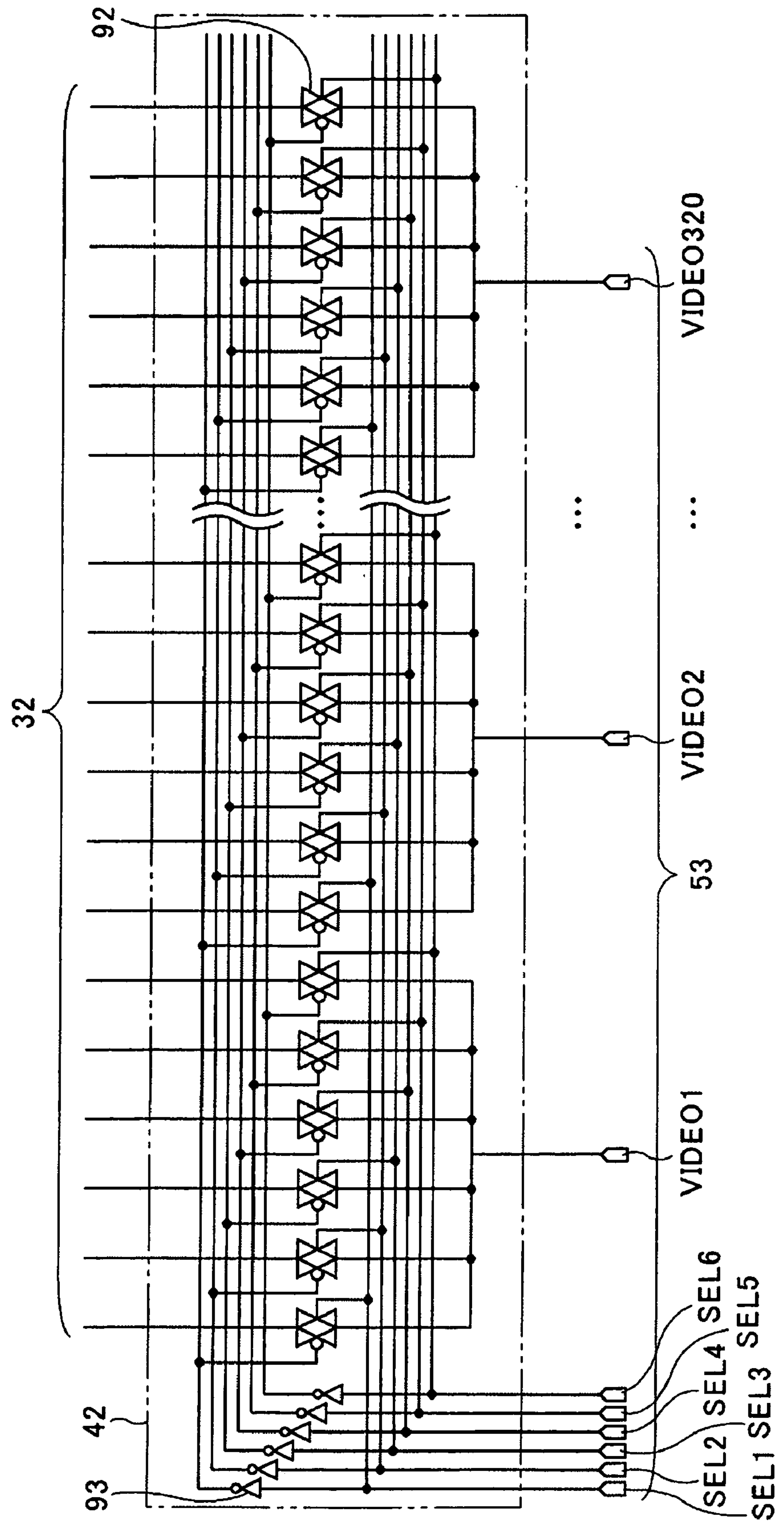
FIG. 6 shows a structure of a data line drive circuit according to the embodiments of this invention.

Next, a structure of the data line drive circuit 42 is described referring to FIG. 6. FIG. 6 shows an example of the structure of the data line drive circuit 42. Each of video signals VIDEO1-VIDEO320 provided from the signal input terminals 53 is connected to a block of six transfer gate switches 92. Each of the transfer gate switches 92 is connected to each of the data lines 32. Selection signals SEL1-SEL6 vary between VHH (9V) and VBB (−4V) and are connected with inverter circuits 93 that generate reverse signals of the selection signal SEL1-SEL6. Power supplies to the inverter circuit 93 are of VHH and VBB levels. An electric potential amplitude of the video signals VIDEO1-VIDEO320 is 0.5V-4.5V.

With the structure as shown in FIG. 6, when the selection signal SEL1 becomes high (VHH) and the other selection signals SEL2-SEL6 become low (VBB), the video signal VIDEO1 is short-circuited to a first data line 32 in the block and is isolated from the other, that is second through sixth, data lines 32 in the same block. When the selection signal SEL2 becomes high (VHH) and the other selection signals SEL1 and SEL3-SEL6 become low (VBB), the video signal VIDEO1 is short-circuited to the second data line 32 in the block and is isolated from the other, that is the first and the third through sixth, data lines 32 in the block. As described above, the video signal VIDEO1 can be distributed among the six data lines 32 by turning the selection signals SEL1-SEL6 to the high electric potential (VHH) one after another in one scan line selection period. This is a partial drive method by a so-called 1:6 multiplexer. It is also possible to make all data lines 32 isolated and floating by setting all selection signals SEL1-SEL6 at the low (VBB) electric potential.

Figure 7:
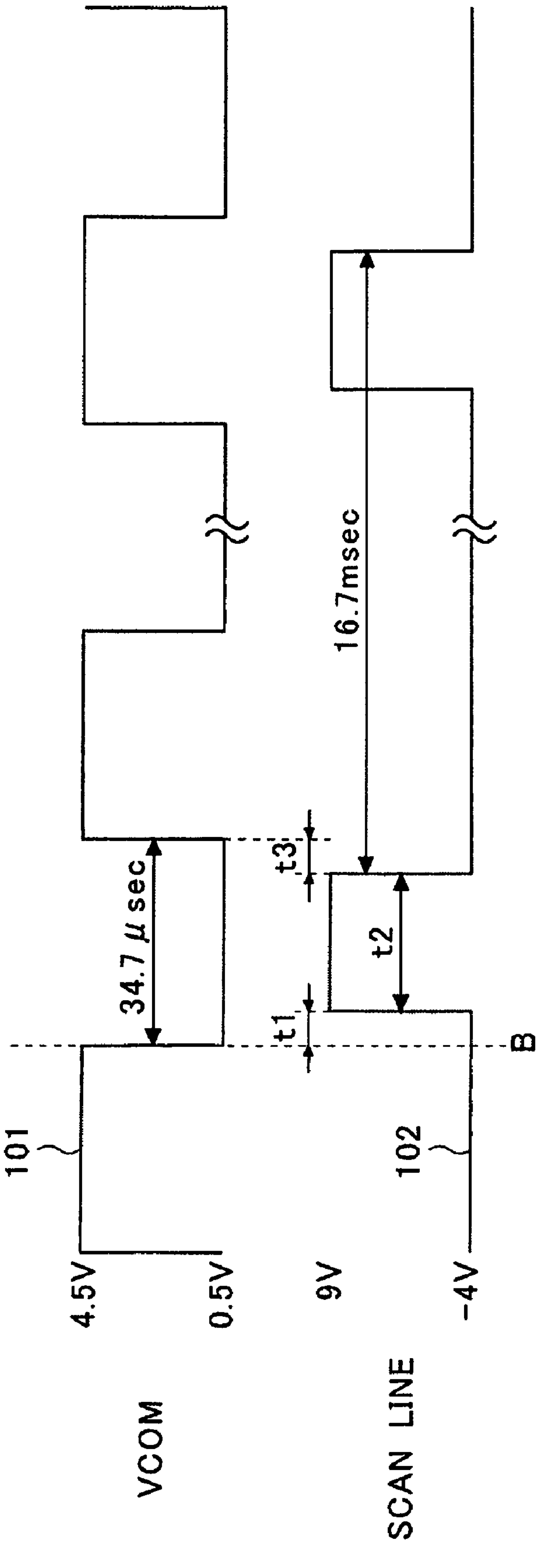
FIG. 7 is a timing chart according to the first embodiment of this invention.

Next, operation of the common electric potential signal VCOM and the scan lines 31 are described hereafter, referring to FIG. 7. FIG. 7 is a timing chart showing an electric potential of the common electric potential signal VCOM that is inputted to the common electric potential input terminal 54 and an electric potential on the scan line 31 in this embodiment. A waveform 101 shows the common electric potential signal VCOM that is inputted to the common electric potential input terminal 54 while a waveform 102 shows the electric potential of the scan line 31. The common electric potential signal VCOM is driven to make an inversion once every 34.7 microseconds at a timing denoted by B in FIG. 7 (hereafter referred to as a common electric potential inversion timing) alternating between 4.5V and 0.5V, while the electric potential of the scan line 31 alternates in a cycle of 16.7 milliseconds between VHH (9V) during a period t2 (scan line selection period) and VBB (−4V) during the other period. The electric potential of the scan line 31 is VBB (−4V) at every common electric potential inversion timing. This is so-called 1 H common inversion drive. In this embodiment, all the selection signals SEL1-SEL6 are kept at VBB (4V) and all the data lines 32 are isolated from the data line drive circuit 42 and are in floating state at the common electric potential inversion timing. A period t1 denotes a length of time from the common electric potential inversion timing till a timing when VHH is written into one of the scan lines 31. A period t3 denotes a length of time from a timing when VBB is written into all the scan lines 31 till the next common electric potential inversion timing. The following equation holds.

$$t1+t2+t3=34.7 \text{ microseconds}$$

How to decide t1, t2 and t3 will be described later.

Figure 8:
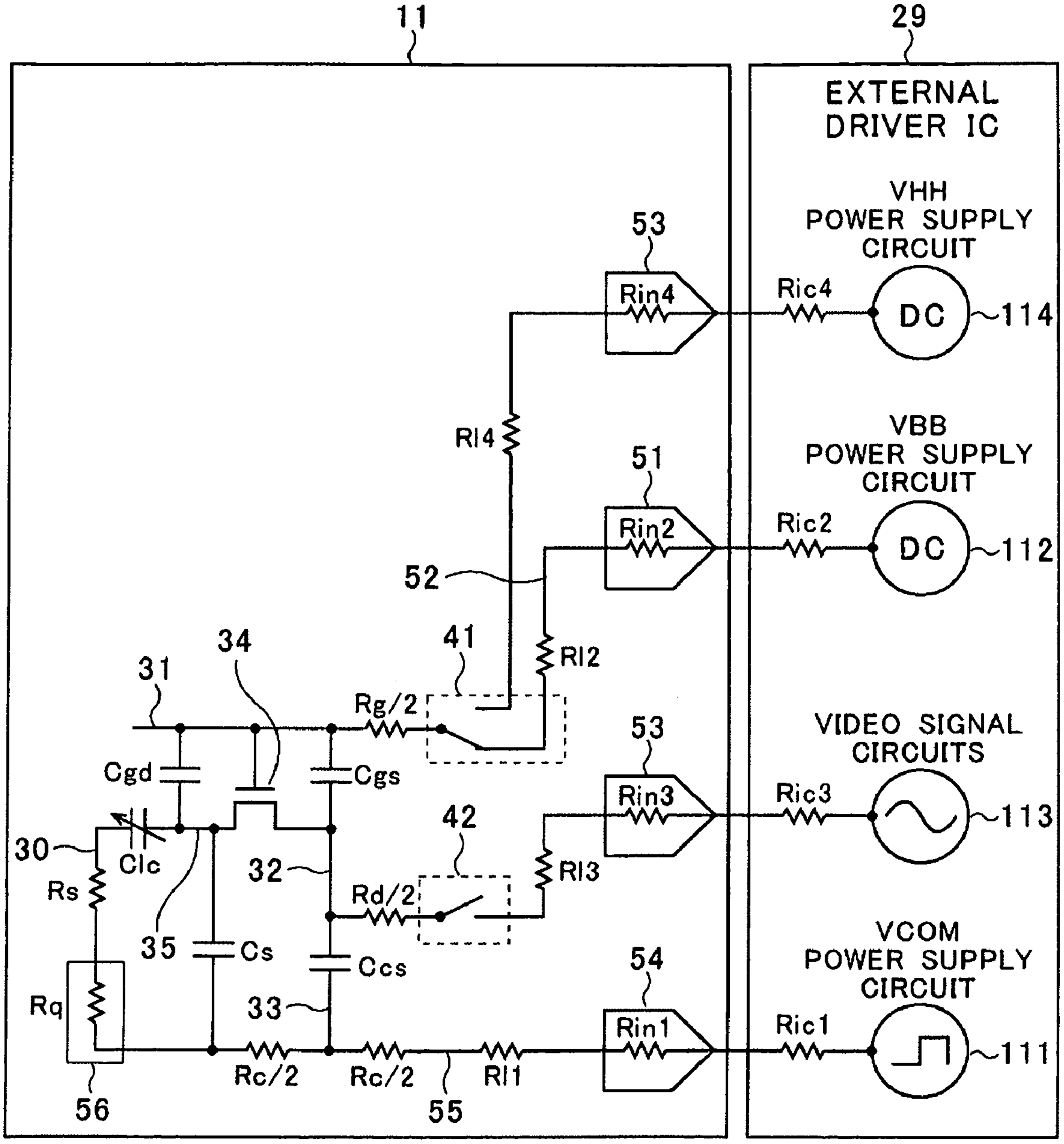
FIG. 8 is a schematic diagram showing loads at a common electric potential inversion timing according to the first embodiment of this invention.
Figure 9:
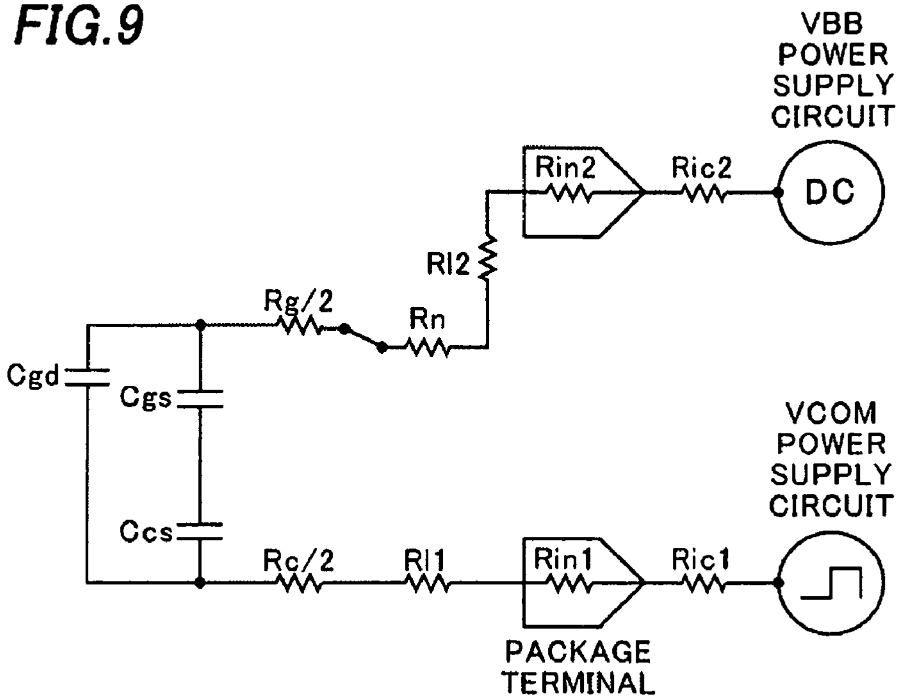
FIG. 9 is a simplified schematic diagram showing the loads according to the first embodiment of this invention.

Next, a capacitance of the common electric potential input terminal 54 at the common electric potential inversion timing is described, referring to FIGS. 8 and 9. FIG. 8 is a schematic circuit diagram showing a lumped constant model of the devices and the wirings on the active matrix substrate 11 for explanation of a capacitance of the common electric potential input terminal 54 at the common electric potential inversion timing in the first embodiment. The lumped constant model is used in the following explanation for simplicity. In reality, loads are distributed two-dimensionally in the display area to make distributed constants which cause an effect due to RC delays in the distributed constant circuit. However the distributed constant circuit is not used here for the sake of easier understanding of this embodiment. In designing an actual device, a final adjustment is to be performed by a simulation with a logic-analog simulation software using a two-dimensional model.

A VCOM power supply circuit 111, a VBB power supply circuit 112, a plurality of video signal circuits 113 and a VHH power supply circuit 114 are integrated in the external driver IC 29. The VCOM power supply circuit 111 is an AC power supply outputting an electric potential shown as the waveform 101 in FIG. 7 and has an IC internal impedance Ric1. An output signal of the VCOM power supply circuit 111 is connected to the common electric potential input terminal 54, further connected to the common electric potential wiring 55 on the active matrix substrate 11 through a mounting resistance Rin1, and yet further connected to the capacitor lines 33 and the vertical conduction portion 56. That is, the common electric potential wiring 55 connects the common electric potential input terminal 54 and the vertical conduction portion 56. The common electric potential wiring 55 has a wiring resistance Rl1. Although each of the capacitor lines 33 connected with the common electric potential wiring 55 has a resistance of Rc (Ω)×m (number of the scan lines), all the capacitor lines 33 is represented by a single wiring in the lumped constant model shown in FIG. 8 and its resistance is estimated as Rc/2. And in the vertical conduction portion 56, connection to the counter electrode 30 on the counter substrate 12 is made by the conductive material through a resistance Rq. A sheet resistance of the counter electrode 30 is Rs.

The VBB power supply circuit 112 is a DC power supply outputting the power supply electric potential VBB and having an IC internal impedance Ric2, and is connected to the power supply terminal 51. The VBB power supply circuit 112 is connected to the power supply wiring 52 on the active matrix substrate 11 through a mounting resistance Rin2 and is further connected to the scan line drive circuit 41 through the power supply wiring 52. That is, the power supply wiring 52 connects the power supply terminal 51 and the scan line drive circuit 41. The power supply wiring 52 has a wiring resistance Rl2. All the scan lines 31 are connected to the power supply electric potential VBB at the common electric potential inversion timing through the N-channel type transistors 84, each having an output impedance of Rn×m. Estimating that a VBB line impedance for each scan line in the scan line drive circuit is Rg×m, the VBB line impedance in the lumped constant model is represented by a resistance Rg/2. The scan line 31 having a resistance Rg is connected to the gate electrode of each pixel switching device 34.

The video signal circuits 113 output the 320 video signals VIDEO1-VIDEO320, having an IC internal impedance Ric3, and are connected to the signal input terminals 53. Although he video signals VIDEO1-VIDEO320 from the video signal circuits 113 are inputted to the data line drive circuit 42 through a mounting resistance Rin3, all the data lines 32 are in high impedance state at the common electric potential inversion timing.

The VHH power supply circuit 114 is a DC power supply outputting the power supply electric potential VHH (9V) as a selection electric potential, having an IC internal impedance Ric4, and is connected to the signal input terminal 53. The VHH power supply circuit 114 is further connected to a power supply wiring on the active matrix substrate 11 through a mounting resistance Rin4. Although the electric potential VHH is inputted to the scan line drive circuit 41 through a power supply wiring, all the scan lines 31 are in high impedance state at the common electric potential inversion timing.

For all the pixels combined, there are a capacitance Cgd between the scan lines 31 (electric potential of the scan lines) and the pixel electrodes 35 (electric potential at the pixel electrodes), a capacitance Cgs between the scan lines 31 (electric potential of the scan lines) and the data lines 32 (electric potential of the data lines), a capacitance Clc between the pixel electrodes 35 (electric potential at the pixel electrodes) and the counter electrode 30 (electric potential at the counter electrode), a capacitance Cs between the pixel electrodes 35 (electric potential at the pixel electrodes) and the capacitor lines 33 (electric potential of the capacitor lines) and a capacitance Ccs between the capacitor lines 33 (electric potential of the capacitor lines) and the data lines 32 (electric potential of the data lines).

Since all the scan lines 31 are connected to the power supply electric potential VBB (−4V), all the pixel switching devices 34 are in the high impedance state.

From results of calculations of electric fields, the capacitances in this embodiment are, Cs=600 nF, Clc=100 nF, Cgd=1 nF, Ccs=5 nF and Cgs=2 nF. Further approximation using these capacitances and omission of devices in the high impedance state simplifies the circuit in FIG. 8 to a circuit shown in FIG. 9 at the common electric potential inversion timing.

A relaxation time τcom at the VCOM inversion timing is represented by the following equation:

$$\tau com=(Cgd+1/(1/Ccs+1/Cgs))\times(Ric1+Ric2+Rin1+Rin2+Rl1+Rl2+Rn+Rg/2+Rc/2)$$

Values of Cgd, Ccs and Cgs are determined almost by the number of pixels, an aperture ratio of the pixels, design rules, device structures of the TFTs and so on, with little room to be reduced by the design without tradeoff against performances, and increase roughly proportional to the number of pixels and a display area.

If VHH is written into the scan line 31 before the common electric potential completes the inversion, however, load capacitances increase because the pixel switching devices 34 connected to the scan line 31 become of low impedance. Therefore, the period t1 shown in FIG. 7 is required to be equal to or longer than a length of time which the common electric potential takes to complete 95% of the inversion, or satisfy the equation 3×τcom≦t1, so that VHH is not written into the scan line 31 before the common electric potential completes the inversion. Thus the period t1 increases as the number of pixels and the display area increase.

On the other hand, while a relaxation time τcom at writing of VBB into the scan line 31 is represented by an equation τgate=(Rg/2+Rn+Rl2)×(capacitance of the scan line 31), the period t3 is required to satisfy the equation 3×τgate≦t3. Thus the period t3 also increases as the number of pixels and the display area increase.

As a result, the period t2 decreases as the number of pixels and the display area increase, eventually leading to a lack of write-in time into the data line 32 and the pixel electrode 35, reducing a manufacturing yield because of thin margin in the manufacturing process. While the period t3 does not depend on the driving method, the period t1 can be reduced to almost zero by using a fixed common drive in which the common electric potential VCOM is fixed to a DC electric potential. That means the common inversion drive gets more restriction than the fixed common drive as the display becomes higher in the resolution and larger in the area. To reduce the restriction, the relaxation time τcom at the common electric potential inversion timing needs to be reduced.

Optimization has to be made for that purpose so as to minimize the value of (Ric1+Ric2+Rin1+Rin2+Rl1+Rl2+Rn+Rg/2+Rc/2). Here, Rc<Rg<Rn<<Rl1, Rl2, Rin1, Rin2. The IC internal impedances Ric1 and Ric2 are fixed values because they are determined by the performance of the IC. To reduce the output impedance Rn of the N-channel type transistors 84 in the output circuit 82, size of the N-channel type transistors 84 is increased to cause a tradeoff against the outer dimensions of the liquid crystal display device 10. Therefore, (Rl1+Rl2+Rin1+Rin2) needs to be reduced in designing as much as possible. An impedance RA between the VCOM power supply circuit 111 and the counter electrode (common electrode) 30 is represented by an equation:

*RA*=*R*in1 (the mounting resistance of the common electric potential input terminal 54)+*Rl*1 (the wiring resistance of the common electric potential wiring 55), while an impedance RB between the VBB power supply circuit 112 and the scan line 31 is represented by an equation:

*RB*=*Rin*2 (the mounting resistance of the power supply terminal 51 of the power supply electric potential *VBB*)+*Rl*2 (the wiring resistance of the power supply wiring 52).

The wiring resistance Rl1 of the common electric potential wiring 55 is inversely proportional to a width W1 of the common electric potential wiring 55, while the wiring resistance Rl2 of the power supply wiring 52 is inversely proportional to a width W2 of the power supply wiring 52. However, a size of the active matrix substrate 11 is determined by the outer dimensions required to the liquid crystal display device 10. When a sum of the signal wirings 57 is denoted by w3, (w1+w2+w3) has to be a predetermined value. Since the minimum line width is determined by requirements of the circuit design or the manufacturing technology, w3 may be set to the minimum value within the requirements. If the common electric potential wiring 55 and the power supply wiring 52 are approximately equal in length to each other, it is necessary to minimize (Rl1+Rl2) that is proportional to (1/W1+1/W2) while satisfying an equation w1+w2=w0 (constant). The solution is w1=w2=½×w0. Since the external dimensions require w0=600 μm in this embodiment, assuming the width of the signal wiring 57 be the practical minimum of 10 μm, the width of the common electric potential wiring is made 300 μm, the width of the power supply wiring 52 is made 300 μm and the width of each of the other signal wirings is made 10 μm. At that time, Rl1=Rl2=30Ω.

As described above, the common inversion relaxation time τcom can be minimized by minimizing the widths of the other signal wirings 57 and setting the width of the common electric potential wiring 55 and the width of the power supply wiring 52 approximately the same maximum width. The width of the common electric potential wiring 55 and the width of the power supply wiring 52 are made precisely equal to each other in this embodiment. Although the widths may differ from each other slightly when the length of the common electric potential wiring 55 is different from the length of the power supply wiring 52 or when there is a restriction in the layout, it is preferable that the wiring resistance Rl1 of the common electric potential wiring 55 and the wiring resistance Rl2 of the power supply wiring 52 are approximately equal to each other. And although the signal wirings 57 may vary in width among themselves in response to a function of each signal, it is preferable that they are smaller in width than any one of the common electric potential wiring 55 and the power supply wiring 52. Here, the signal wirings 57 mean wirings providing the scan line drive circuit 41 with the clock signal VCLK, the start pulse signal VSP, the enable signal VENB and the electric potential VHH as the selection electric potential and the wirings providing the data line drive circuit 42 with the video signals VIDEO1-VIDEO320.

The mounting resistance Rin1 of the common electric potential input terminal 54 is approximately inversely proportional to a total area S1 of the common electric potential input terminal 54, while the mounting resistance Rin2 of the power supply terminal 51 of power supply electric potential VBB is approximately inversely proportional to a total area S2 of the power supply terminal 51. However, a sum of the total areas of the power supply terminal 51, the signal input terminals 53 and the common electric potential input terminal 54 needs to be suppressed to a certain value or less due to restrictions by the size of the external IC to be mounted and mounting process. Also a minimum area S3 of the signal input terminal 53 is limited to a certain value because of the mounting resistance and accuracy of the mounting. That is, (S1+S2) also needs to be suppressed to a certain value. The requirement is to minimize (Rin1+Rin2) that is proportional to (1/S1+1/S2), while satisfying S1+S2=S0 (constant). So, the best solution to the requirement is S1=S2=½×S0. Since S0=15000 square micrometers in this embodiment due to various restrictions, it is set that S1=S2=7500 square micrometers.

Figure 10:
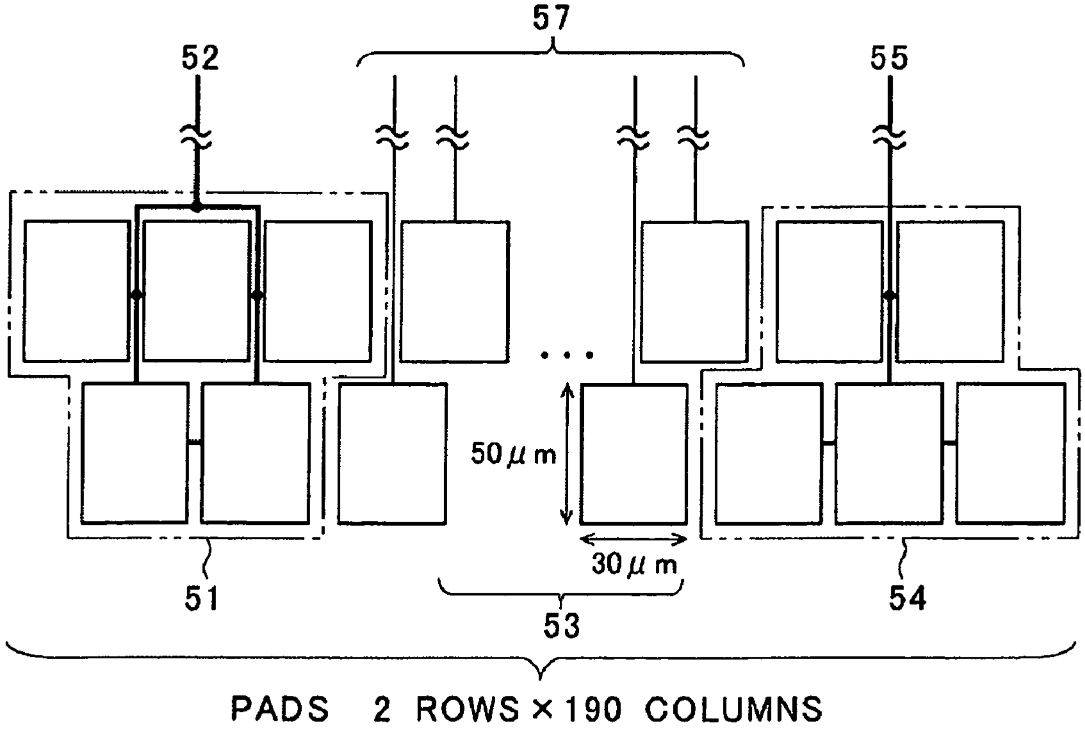
FIG. 10 shows mounting terminals according to the first embodiment of this invention.

Next, an arrangement of the mounting terminals is described referring to FIG. 10. FIG. 10 shows the arrangement of the mounting terminals for the power supply terminal 51, the signal input terminals 53 and the common electric potential input terminal 54 disposed on the extended portion 27 in this embodiment. A plurality of unit mounting terminals, each being 30 μm×50 μm in size that is determined by requirements of the mounting technology, is arrayed in zigzag pattern of 2 rows×190 columns. Each of the mounting terminals is made of one or more than one unit mounting terminals. The common electric potential input terminal 54 is made of five unit mounting terminals, while the power supply terminal 51 is made of five unit mounting terminals also. Each of the plurality of signal input terminals 53 is assigned one each of the unit mounting terminals. It is preferable that minimum mounting area is assigned to each of the signal input terminals 53 and the remaining mounting area is equally divided and assigned to the power supply terminal 51 and the common electric input terminal 54, as described above. In this embodiment, the mounting resistance Rin1 of the common electric potential input terminal 54 is 5Ω, and the mounting resistance Rin2 of the power supply terminal 51 is 5Ω. Thus, RA=RB=35Ω.

Although the impedance RA between the VCOM power supply circuit 111 and the counter electrode 30 is made exactly equal to the impedance RB between the VBB power supply circuit 112 and the scan line 31 in the embodiment, a ratio of RA to RB varies in a range between 1:2 and 2:1 due to manufacturing variations in reality. However, it is expected that the effect of the invention is obtained in a range of the ratio of RA to RB between 1:6 and 6:1.

Although each of the plurality of signal input terminals 53 is assumed to have the same mounting terminal area, each of them may have a different terminal area depending on its function. Even in that case, however, it is preferable that the area of the common electric potential input terminal 54 and the area of the power supply terminal 51 are larger than any of the other signal input terminals 53. When the number of the unit mounting terminals assignable to the power supply terminal 51 and the common electric potential input terminal 54 is odd number, either of them may be assigned one more unit mounting terminal than the other.

In this embodiment, since Ric1=35Ω, Ric2=20Ω, Rn=3Ω, Rg=10Ω and Rc=2Ω, the common inversion relaxation time τcom=140Ω×2.4 nF=340 nanoseconds. Setting the period t1, that is the period between the common electric potential inversion timing and the timing when VHH is written into the scan lines 31, to be 1 microsecond, an enough write-in time, that is the scan line selection period t2=32.7 microseconds, can be secured. As a result, it is made possible to apply the common inversion drive to a four inch diagonal panel with VGA resolution that has been difficult to apply the common inversion drive and to manufacture the panel with a high yield. Therefore, it is made possible to realize a low cost, low power consumption liquid crystal display device using a less expensive low withstand voltage IC as an external driver IC without reducing yields.

Figure 11:
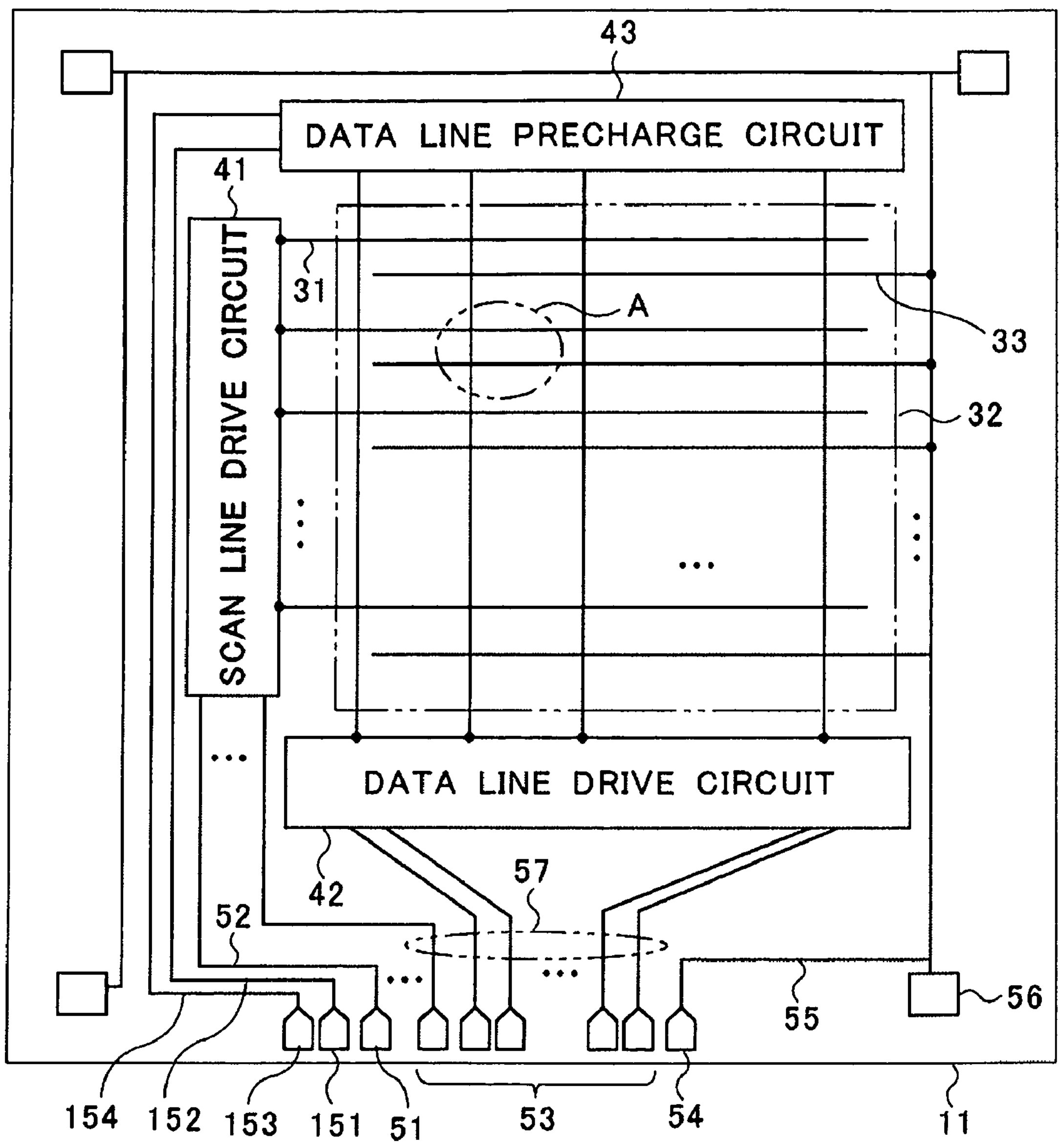
FIG. 11 shows a structure of an active matrix substrate according to a second embodiment of this invention.

Next, a liquid crystal display device according to a second embodiment of this invention is described. FIG. 11 shows the active matrix substrate 11 that implements the second embodiment of this invention. A structure of the liquid crystal display device 10 using the active matrix substrate 11 according to the second embodiment is omitted because it is not different from the liquid crystal display device 10 according to the first embodiment.

On the active matrix substrate 11 according to the second embodiment, m scan lines 31 and n data lines 32 are formed to intersect with each other, and m capacitor lines 33 are disposed parallel to the scan lines 31 so that each of the capacitor lines 33 is paired with each of the scan lines 31.

The scan lines 31 are connected to a scan line drive circuit 41. A power supply terminal 51 is connected to the scan line drive circuit 41 through a power supply wiring 52 as well as a plurality of signal input terminals 53 being connected through a plurality of signal wirings 57. The scan line drive circuit 41 is provided from the power supply terminal 51 with a DC power supply electric potential VBB (−4V) that renders the scan lines 31 in holding state (non-selected state) and from the signal input terminals 53 with various necessary signals and a signal to give the power supply electric potential. One end of each of the data lines 32 is connected with the data line drive circuit 42 while the other end of it is connected with a data line precharge circuit 43. The data line drive circuit 42 is connected to the plurality of signal input terminals 53 through the signal wirings 57 and is provided with various necessary signals and a signal to give the power supply electric potential. The data line precharge circuit 43 is connected with a timing signal terminal 151 through a timing signal wiring 152 as well as connected with a precharge electric potential terminal 153 through a precharge electric potential wiring 154.

The capacitor lines 33 are connected with each other and connected to a common electric potential input terminal 54 through a common electric potential wiring 55, and are provided with a common electric potential signal VCOM that alternates between −4.5V and −0.5V. The counter electrode on the counter substrate is connected with the vertical conduction portion 56 that is disposed at each of four corners of the active matrix substrate 11 and is similarly connected to the common electric potential input terminal 54 through the common electric potential wiring 55.

Figure 12:
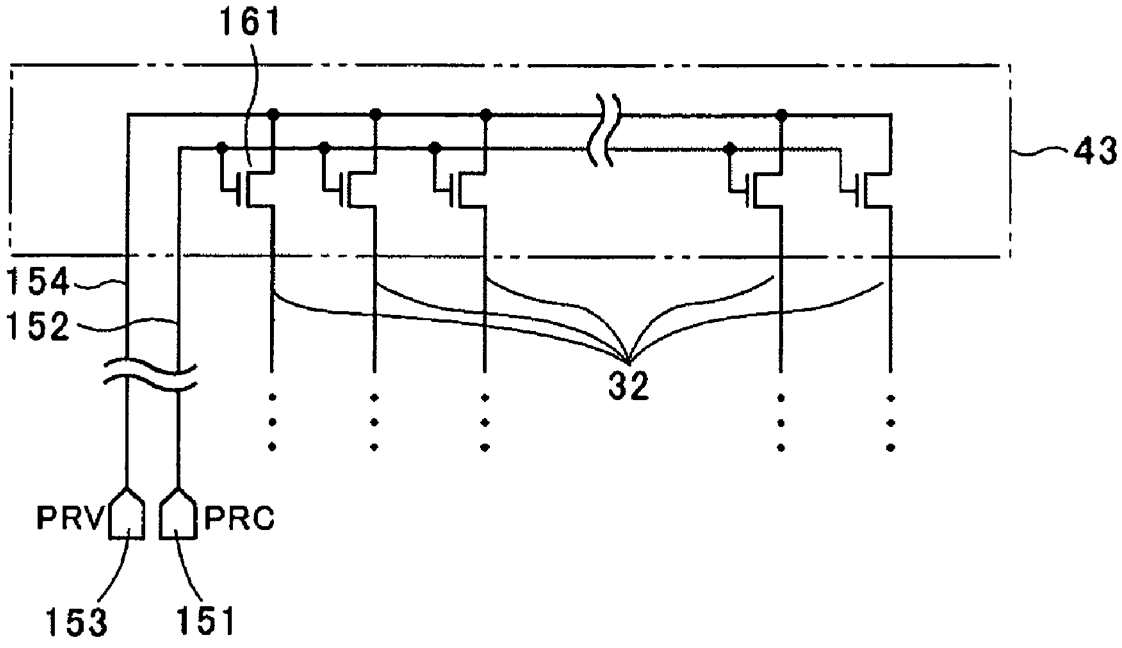
FIG. 12 shows a structure of a data line precharge circuit according to the second embodiment of this invention.

FIG. 12 shows a structure of the data line precharge circuit 43. Each of the data lines 32 is connected to a drain of each of N-channel type thin film transistors that constitute precharge switches 161. Gate electrodes of the precharge switches 161 are connected to the timing signal terminal 151 through the timing signal wiring 152 and are provided with a timing signal PRC. Source electrodes of the precharge switches 161 are connected to the precharge electric potential terminal 153 through the precharge electric potential wiring 154 and are provided with a precharge electric potential PRV.

Figure 13:
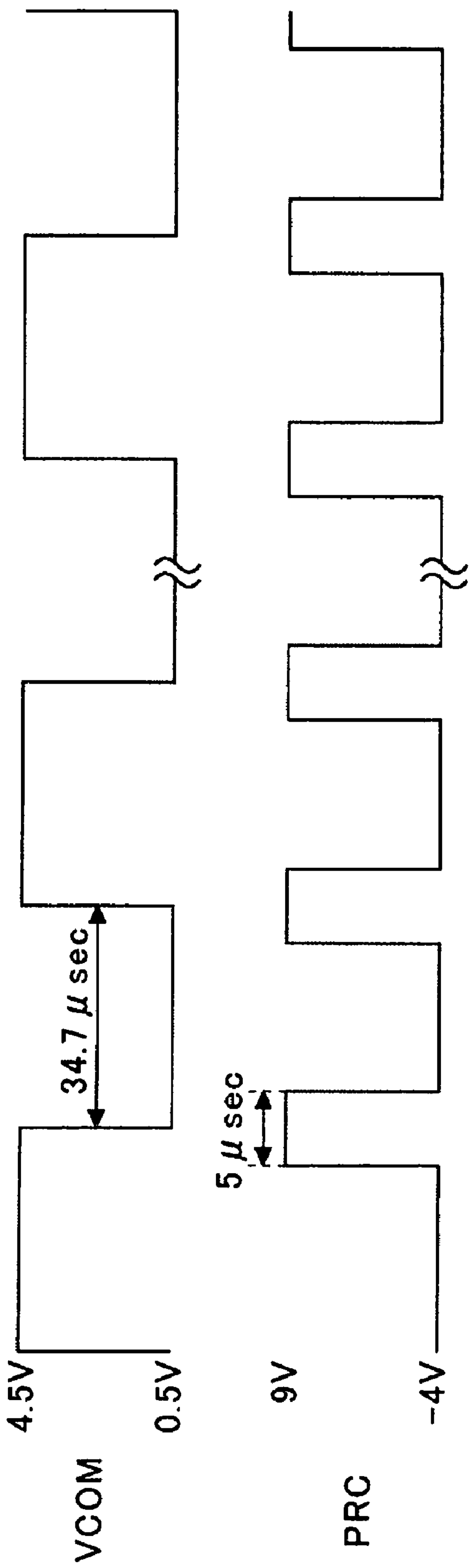
FIG. 13 is a timing chart according to the second embodiment of this invention.

The timing signal PRC is at a high level (9V) for a period of 5 microseconds encompassing the timing when VCOM inverts and is at a low level (−4V) for the other period, as shown in FIG. 13. The data lines 32 are short-circuited to the precharge electric potential PRV for the period during which the timing signal PRC is at the high level. Since the electric potential of the data lines 32 remains constant for the period encompassing the VCOM inversion timing with the structure described above, the write-in time into the data lines 32 can be reduced and a power supply voltage of the data line drive circuit 42 can be lowered to reduce the power consumption compared with a structure without the data line precharge circuit 43. The power supply voltage of the data line drive circuit 42 can be further lowered by setting the precharge electric potential PRV at an intermediate value between the high voltage and the low voltage of the common electric potential VCOM. The precharge electric potential PRV is set at a DC electric potential of 2.5V in the second embodiment.

Descriptions of structures of pixels disposed at intersections of the scan lines 31 and the data lines 32, the scan line drive circuit 41 and the data line drive circuit 42 are omitted because they are same as those in the first embodiment. The second embodiment is largely different from the first embodiment in that the data lines 32 are short-circuited to the precharge electric potential PRV at the VCOM inversion timing in the second embodiment.

Figure 14:
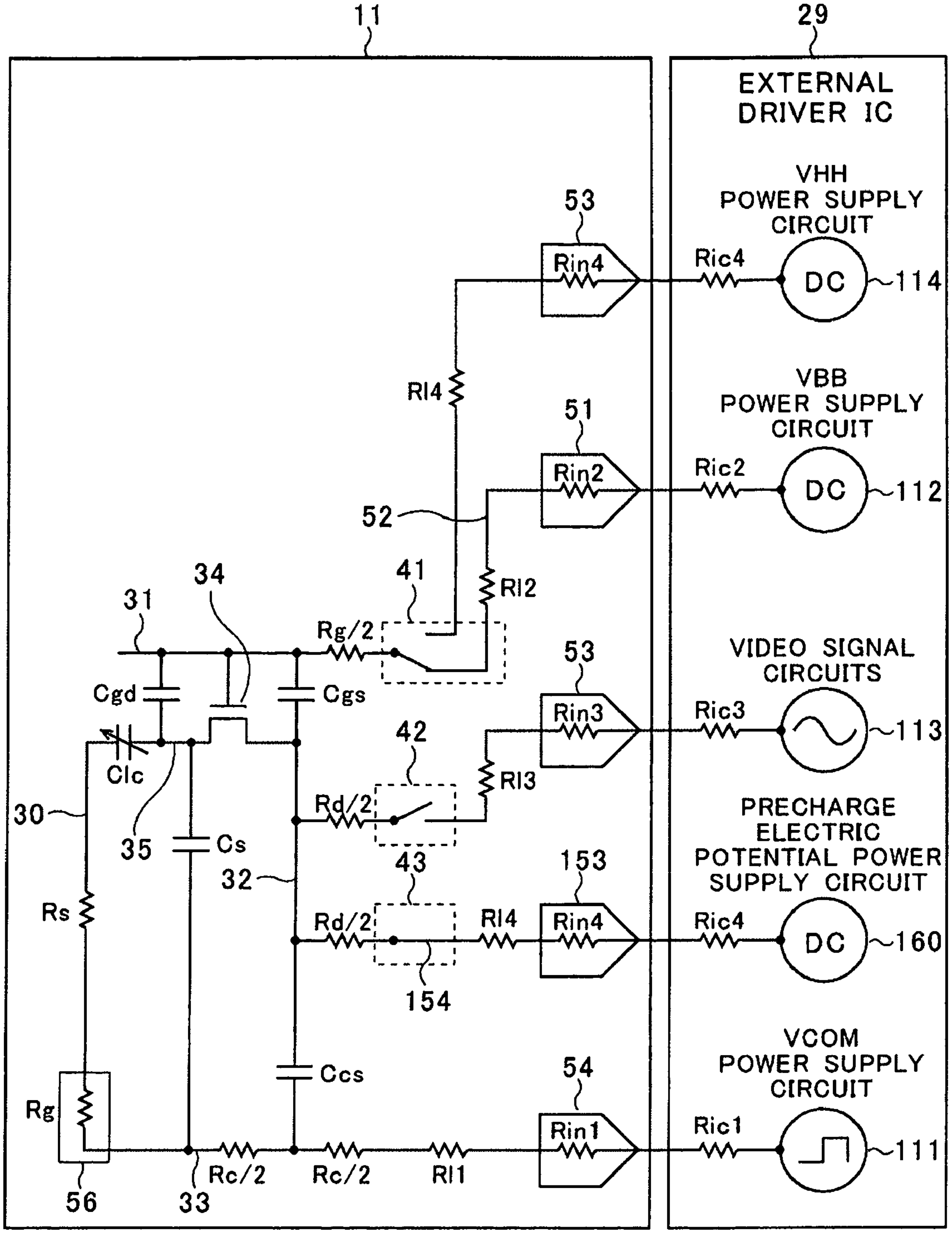
FIG. 14 is a schematic diagram showing loads at the common electric potential inversion timing according to the second embodiment of this invention.

FIG. 14 is a schematic circuit diagram showing a lumped constant model of the devices and the wirings on the active matrix substrate 11 for explanation of a capacitance of the common electric potential input terminal 54 at the common electric potential inversion timing in the second embodiment. Compared with the first embodiment shown in FIG. 8, an external driver IC 29 further integrates a precharge electric potential power supply circuit 160 in addition to the VCOM power supply circuit 111, the VBB power supply circuit 112, the plurality of video signal circuits 113 and the VHH power supply circuit 114, and the data line 32 is short-circuited with the precharge electric potential power supply circuit 160 through the data line precharge circuit 43, the precharge electric potential wiring 154 and the precharge electric potential terminal 153.

Figure 15:
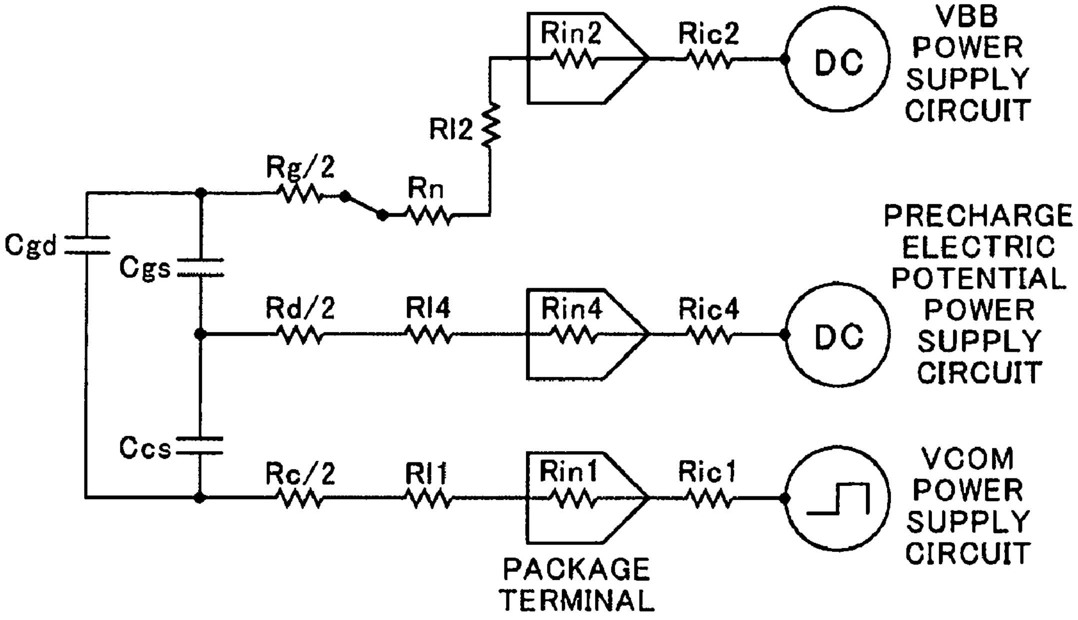
FIG. 15 is a simplified schematic diagram showing the loads according to the second embodiment of this invention.

Capacitances in the second embodiment are the capacitance Cs=600 nF between the pixel electrodes 35 and the capacitor lines 33, the capacitance Clc=100 nF between the pixel electrodes 35 and the counter electrode 30, the capacitance Cgd=1 nF between the scan lines 31 and the pixel electrodes 35, the capacitance Ccs=5 nF between the capacitor lines 33 and the data lines 32 and the capacitance Cgs=2 nF between the scan lines 31 and the data lines 32. Further approximation based on the above leads to a simplified model shown in FIG. 15. In order to minimize the relaxation time τcom at the common electric potential inversion timing in this case, it is preferable to determine a width of the power supply wiring 52 and the number of the unit mounting terminals constituting the power supply terminal 51 so that the following equations are approximately satisfied:

$Rl1$ (the wiring resistance of the common electric potential wiring 55)=$(Ccs+Cgd)/Cgd\times Rl2$ (the wiring resistance of the power supply wiring 52).

$Rl4$ (a wiring resistance of the precharge electric potential wiring 154)=$(Ccs+Cgd)/Ccs\times Rl2$ (the wiring resistance of the power supply wiring 52).

$Rin1$ (the mounting resistance of the common electric potential input terminal 54)=$(Ccs+Cgd)/Cgd\times Rin2$ (the mounting resistance of the power supply terminal 51 of the power supply electric potential $VBB$).

$Rin4$ (a mounting resistance of the precharge electric potential terminal 153)=$(Ccs+Cgd)/Ccs\times Rin2$ (the mounting resistance of the power supply terminal 51 of the power supply electric potential $VBB$).

That is, it is preferable that 1/Rl1+1/Rl4=1/Rl2 and 1/Rin1+1/Rin4=1/Rin2, a sum of the width of the power supply wiring 52 and a width of the precharge electric potential wiring 154 is approximately equal to a width of the common electric potential wiring 55 and a sum of an area of the power supply terminal 51 and an area of the precharge electric potential terminal 153 is approximately equal to an area of the common electric potential input terminal 54.

Figure 16:
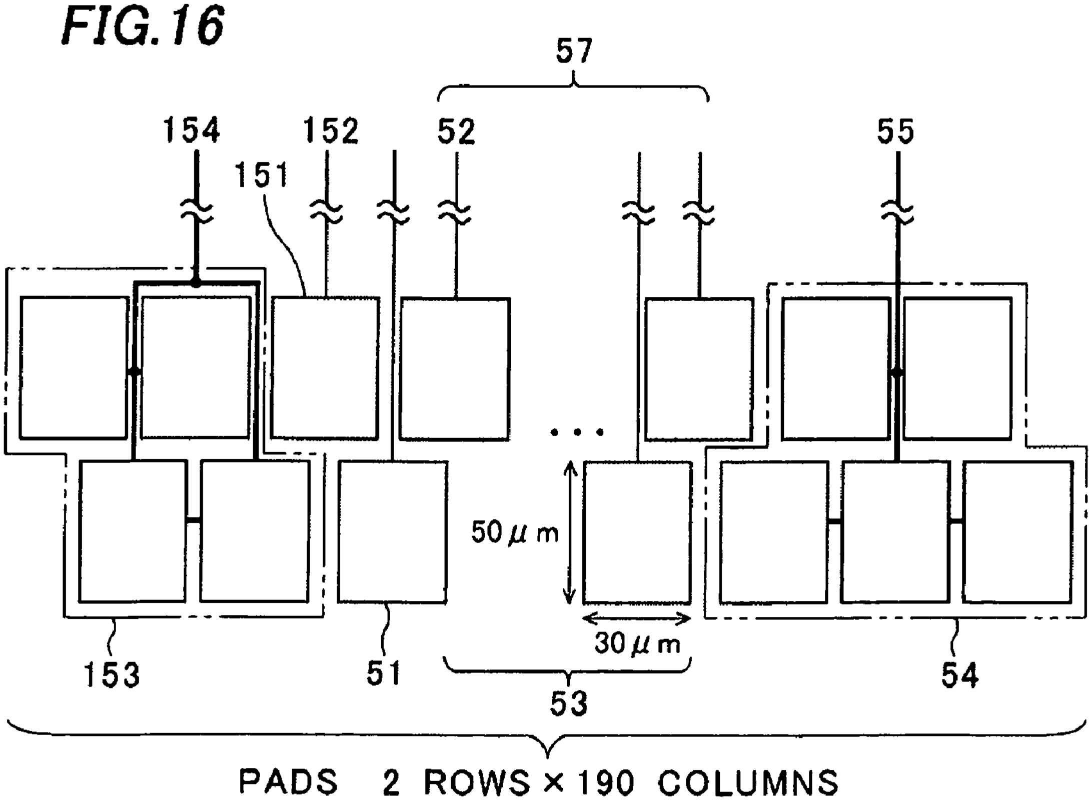
FIG. 16 shows mounting terminals according to the second embodiment of this invention.

Based on the above, the width of the common electric potential wiring 55 is made 300 μm, the width of the precharge electric potential wiring 154 is made 250 μm and the width of the power supply wiring 52 is made 50 μm. The width of each of the signal wirings 57 and the timing signal wirings 152 is 10 μm that is a minimum width according to the design rules. At that time, Rl2=30Ω, Rl1=180Ω and Rl4=360Ω. The common electric potential input terminal 54 uses five unit mounting terminals, each measuring 30 μm×50 μm, the precharge electric potential terminal 153 similarly uses four unit mounting terminals, each measuring 30 μm×50 μm, while the power supply terminal 51, each of the signal input terminals 53 and each of the timing signal terminals 151 use one unit mounting terminal measuring 30 μm×50 μm, as shown in FIG. 16. At that time, Rin2=5Ω, Rin4=6.3Ω and Rin1=25Ω.

With the settings described above, the common inversion relaxation time τcom becomes 1.3 microseconds. Enough relaxation time τcom and charging time are obtained by setting t1 (the period between the common electric potential inversion timing and the timing when VHH is written into the scan lines 31)=4 microseconds and t2 (the scan line selection period)=29.7 microseconds.

An electronic device according to a third embodiment of this invention is described hereafter. Note that the third embodiment shows an example this invention, which is not limited to the third embodiment.

Figure 17:
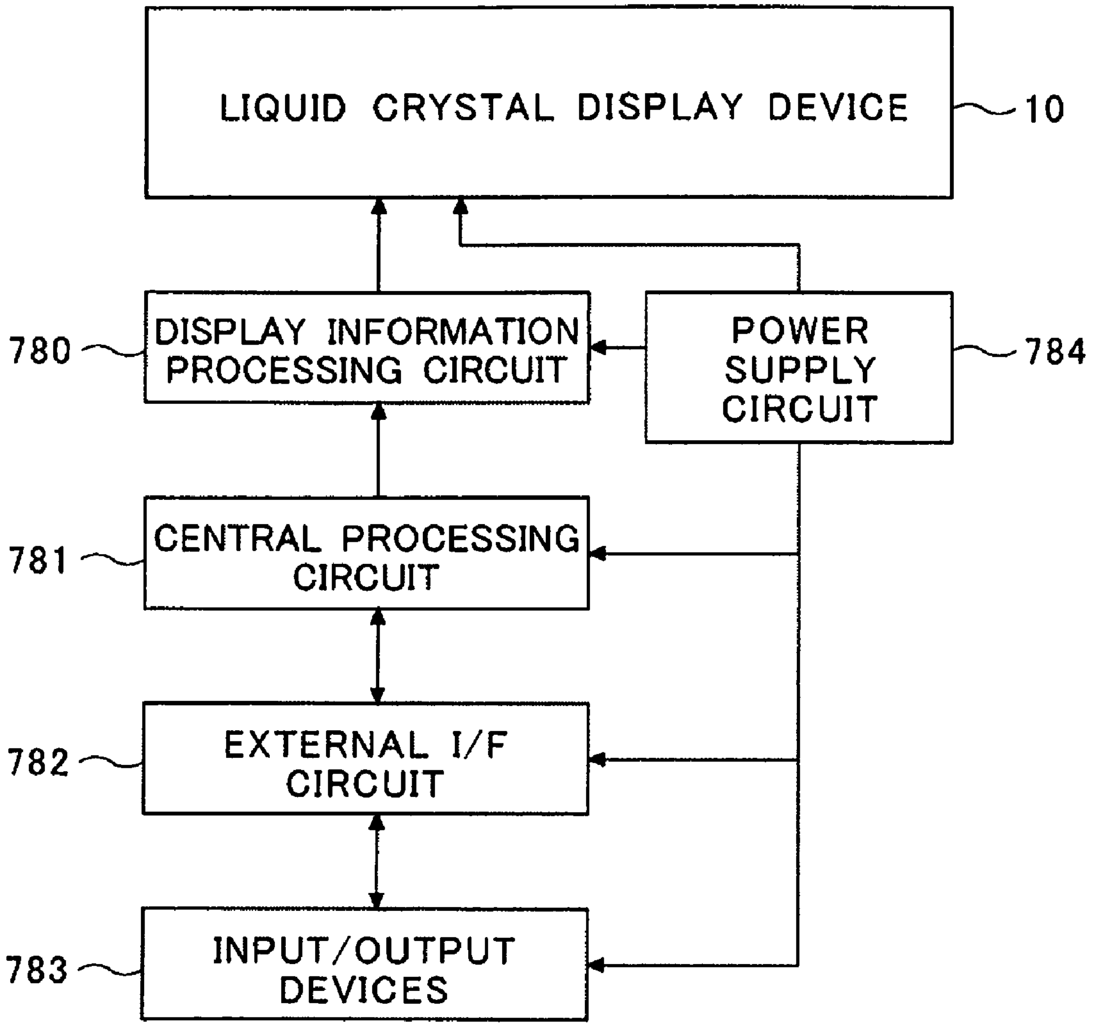
FIG. 17 shows a structure of an electronic device according to a third embodiment of this invention.

FIG. 17 shows an electronic device according to the third embodiment of this invention. The electronic device shown here is made of a liquid crystal display device 10, a display information processing circuit 780 that controls the liquid crystal display device 10, a central processing circuit 781, an external I/F circuit 782, input/output devices 783 and a power supply circuit 784.

The display information processing circuit 780 re-writes video data stored in a RAM (Random Access Memory) at appropriate timings and provides the liquid crystal display device 10 with the video data together with timing signals, based on commands from the central processing circuit 781. The central processing circuit 781 performs various processing based on inputs from the external I/F circuit 782 and outputs the commands to the display information processing circuit 780 and the external I/F circuit 782 based on results of the processing. The external I/F circuit 782 controls the input/output devices 783 based on the commands from the central processing circuit 781 as well as sending information from the input/output devices 783 to the central processing circuit 781. The input/output devices 783 refer to a switch, a keyboard, a hard disk drive, a flash memory unit and the like. The power supply circuit 784 provides the above-mentioned components with a predetermined power supply voltage.

The electronic device refers to a monitor, a TV, a note PC, a PDA (Personal Digital Assistant), a digital still camera, a camcorder, a mobile telephone, a photo viewer, a video player, a DVD player, an audio player or the like.

This invention is not limited to the embodiments described above and may be applied to a liquid crystal display device not only of a TN (twisted nematic) mode but also of a VA (Vertical Alignment) mode that uses a liquid crystal having a negative dielectric constant anisotropy or of an IPS mode that utilizes lateral electric field. Also, the liquid crystal display device may be not only the transmission type but also a reflection type or a combination of the reflection and transmission types. The active device may be not only the polysilicon TFT but also amorphous silicon TFT or other active devices.

What is claimed is:

1. A liquid crystal display device comprising:

a plurality of scan lines disposed on a substrate;

a plurality of data lines disposed on the substrate and intersecting the scan lines;

a plurality of pixel switching devices disposed on the substrate and corresponding to intersections of the data lines and the scan lines;

a plurality of pixel electrodes disposed on the substrate, each of the pixel electrodes being connected with a corresponding pixel switching device;

a common electrode disposed over the pixel electrodes;

a common power supply circuit connected with the common electrode and outputting a square wave signal alternating between a higher electric potential and a lower electric potential at a common electric potential inversion timing; and a first reference electric potential power supply circuit that outputs a first reference electric potential to the scan lines in a manner that at every common electric potential inversion timing the scan lines receive the first reference electric potential, wherein an impedance between the common power supply circuit and the common electrode is approximately the same as an impedance between the first reference electric potential power supply circuit and the scan lines.

2. The liquid crystal display device of claim 1, further comprising a first wiring that electrically connects the first reference electric potential power supply circuit with the scan lines and a second wiring that electrically connects the common power supply circuit with the common electrode, wherein a width of the first wiring is approximately equal to a width of the second wiring.

3. The liquid crystal display device of claim 2, further comprising a drive circuit that drives the scan lines or the data lines and additional wirings that are connected with the drive circuit, wherein the smaller of the widths of the first and second wirings is greater than a width of any of the additional wirings.

4. The liquid crystal display device of claim 1, further comprising a first mounting terminal disposed on the substrate and connected with the first reference electric potential power supply circuit, a second mounting terminal disposed on the substrate and connected with the common power supply circuit, and additional mounting terminals disposed on the substrate, wherein the first mounting terminal is approximately equal to the second mounting terminal in area or in the number of unit mounting terminals that constitute the first, second and additional mounting terminals.

5. The liquid crystal display device of claim 4, wherein the smaller of the first and second mounting terminals is larger than any of the additional mounting terminals in area or in the number of the unit mounting terminals.

6. The liquid crystal display device of claim 1, further comprising a second reference electric potential power supply circuit that outputs a second reference electric potential and is connected with the data lines at the common electric potential inversion timing.

7. The liquid crystal display device of claim 6, further comprising a first wiring that electrically connects the first reference electric potential power supply circuit with the scan lines, a second wiring that electrically connects the common power supply circuit with the common electrode and a third wiring that electrically connects the second reference electric potential power supply circuit with the data lines, wherein a sum of a width of the first wiring and a width of the third wiring is approximately equal to a width of the second wiring.

8. The liquid crystal display device of claim 7, further comprising a drive circuit that drives the scan lines or the data lines and additional wirings that are connected with the drive circuit, wherein the smallest of widths of the first, second and third wirings is greater than a width of any of the additional wirings.

9. The liquid crystal display device of claim 6, further comprising a first mounting terminal disposed on the substrate and connected with the first reference electric potential power supply circuit, a second mounting terminal disposed on the substrate and connected with the common power supply circuit and a third mounting terminal disposed on the substrate and connected with the second reference electric potential power supply circuit, wherein a sum of the number of unit mounting terminals that constitute the first mounting terminal and the number of unit mounting terminals that constitute the third mounting terminal is approximately equal to the number of unit mounting terminals that constitute the second mounting terminal or a sum of an area of the first mounting terminal and an area of the third mounting terminal is approximately equal to an area of the second mounting terminal.

10. The liquid crystal display device of claim 6 further comprising a first mounting terminal disposed on the substrate and connected with the first reference electric potential power supply circuit, a second mounting terminal disposed on the substrate and connected with the common power supply circuit, a third mounting terminal disposed on the substrate and connected with the second reference electric potential power supply circuit and additional mounting terminals disposed on the substrate, wherein the smallest of the first, second or third mounting terminals is larger than any of the additional mounting terminals in area or in the number of the unit mounting terminals that constitute the first, second, third and additional mounting terminals.

11. A liquid crystal display device comprising:

a plurality of scan lines disposed on a substrate;

a plurality of data lines disposed on the substrate and intersecting the scan lines;

a plurality of pixel switching devices disposed on the substrate and corresponding to intersections of the data lines and the scan lines;

a plurality of pixel electrodes disposed on the substrate, each of the pixel electrodes being connected with a corresponding pixel switching device;

a common electrode disposed over the pixel electrodes;

a common power supply circuit connected with the common electrode and outputting a square wave signal alternating between a higher electric potential and a lower electric potential at a common electric potential inversion timing;

a first reference electric potential power supply circuit that provides the scan lines with a non-selection electric potential;

a common electric potential wiring electrically connecting the common electrode and a common electric potential terminal to which the square wave signal from the common power supply circuit is applied; and a power supply wiring that electrically connects a scan line drive circuit that drives the scan lines and a power supply terminal to which the non-selection electric potential is applied from the first reference electric potential power supply circuit, wherein an impedance of the common electric potential wiring is approximately equal to an impedance of the power supply wiring.

12. An electronic device comprising:

a central processing unit;

a display information processing circuit; and the liquid crystal display device of claim 1, which is connected with the central processing unit and the display information processing unit.

13. The liquid crystal display device of claim 1, further comprising an additional reference electric potential power supply circuit that outputs an additional reference electric potential to the scan lines, wherein the first reference electric potential is lower than the additional reference electric potential.

* * * * *